(12) United States Patent
Nishino

(10) Patent No.: US 12,555,146 B2
(45) Date of Patent: Feb. 17, 2026

(54) COST CALCULATION AND PAYMENT DEVICE, COST CALCULATION AND PAYMENT SYSTEM, AND COST CALCULATION AND PAYMENT METHOD

(71) Applicant: Panasonic Intellectual Property Management Co., Ltd., Osaka (JP)

(72) Inventor: Kouhei Nishino, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 18/278,353

(22) PCT Filed: Nov. 30, 2021

(86) PCT No.: PCT/JP2021/043734
§ 371 (c)(1),
(2) Date: Aug. 22, 2023

(87) PCT Pub. No.: WO2022/180970
PCT Pub. Date: Sep. 1, 2022

(65) Prior Publication Data
US 2024/0185310 A1    Jun. 6, 2024

(30) Foreign Application Priority Data
Feb. 26, 2021   (JP) ................................ 2021-030129

(51) Int. Cl.
*G06Q 20/20*    (2012.01)
*G02B 27/01*    (2006.01)
(Continued)

(52) U.S. Cl.
CPC ....... *G06Q 30/0283* (2013.01); *G02B 27/017* (2013.01); *G06F 3/017* (2013.01);
(Continued)

(58) Field of Classification Search
CPC .. G06Q 30/0283; G06Q 20/18; G06Q 20/201; G06Q 20/321; G06Q 30/0641;
(Continued)

(56) References Cited

U.S. PATENT DOCUMENTS 7,685,023 B1 *  3/2010 Abraham ........... G06Q 30/0603
                                                    705/27.2
10,134,084 B1 *  11/2018 Gabriele ................ G06Q 20/12
(Continued)

FOREIGN PATENT DOCUMENTS

AU      2011276637 A1 *  2/2013 ........... G06V 10/451
CN      211062005 U    *  7/2020
(Continued)

OTHER PUBLICATIONS

International Search Report (ISR) from International Searching Authority (Japan Patent Office) in International Pat. Appl. No. PCT/JP2021/043734, dated Jan. 25, 2022, together with an English language translation.

*Primary Examiner* — Ashford S Hayles
(74) *Attorney, Agent, or Firm* — Greenblum & Bernstein, P.L.C.

(57) ABSTRACT

A virtual merchandise sales area controller controls MR glasses worn by a user to display virtual merchandise items as virtual objects in a superimposed manner in a store as a real space and detects the user's operation of selecting a virtual merchandise item. Then, in response to the user's operation of selecting the virtual merchandise item, a checkout counter controls the MR glasses to display the virtual merchandise item in a superimposed manner on a tray as the real space such that the virtual merchandise item is positioned alongside a real merchandise item placed on the tray, and performs cost calculation of the virtual merchandise item together with the real merchandise item.

9 Claims, 11 Drawing Sheets

(51) Int. Cl.
  *G06F 3/01*        (2006.01)
  *G06Q 20/18*       (2012.01)
  *G06Q 30/0283*     (2023.01)
  *G06T 19/00*       (2011.01)
  *G06V 40/18*       (2022.01)
  *G07G 1/06*        (2006.01)

(52) U.S. Cl.
  CPC ........... *G06Q 20/18* (2013.01); *G06Q 20/201* (2013.01); *G06Q 20/208* (2013.01); *G06T 19/006* (2013.01); *G06V 40/197* (2022.01); *G07G 1/06* (2013.01); *G02B 2027/0138* (2013.01); *G02B 2027/0178* (2013.01)

(58) Field of Classification Search
  CPC ............. G06Q 30/0643; G02B 27/017; G02B 2027/0138; G02B 2027/0178; G06F 3/017; G06F 3/01; G06V 20/20; G07G 1/0036
  See application file for complete search history.

(56) References Cited

U.S. PATENT DOCUMENTS

| | | | |
|---|---|---|---|
| 10,510,218 B2 | 12/2019 | Kinno et al. | |
| 2011/0022980 A1* | 1/2011 | Segal | G07F 9/023 715/764 |
| 2012/0004769 A1* | 1/2012 | Hallenbeck | G07F 11/62 700/232 |
| 2012/0223943 A1* | 9/2012 | Williams | G06Q 30/06 345/173 |
| 2013/0297435 A1* | 11/2013 | Prellwitz | G06Q 20/20 705/22 |
| 2014/0129328 A1* | 5/2014 | Mathew | G06Q 30/00 705/14.58 |
| 2014/0129393 A1* | 5/2014 | Soon-Shiong | G06F 3/0484 705/27.2 |
| 2014/0282162 A1* | 9/2014 | Fein | G06F 3/0486 715/810 |
| 2014/0363059 A1* | 12/2014 | Hurewitz | G06Q 30/0201 382/118 |
| 2015/0142611 A1* | 5/2015 | Kaplan | G06Q 30/0635 705/26.81 |
| 2017/0116667 A1* | 4/2017 | High | G06T 19/006 |
| 2018/0047093 A1* | 2/2018 | High | G06F 1/1652 |
| 2018/0060943 A1* | 3/2018 | Mattingly | G06Q 20/12 |
| 2018/0068368 A1* | 3/2018 | Mattingly | G06Q 30/0623 |
| 2018/0150892 A1* | 5/2018 | Waldron | G06Q 30/0631 |
| 2018/0158060 A1* | 6/2018 | Adams | H04W 12/06 |
| 2018/0232595 A1* | 8/2018 | Nobuoka | G06V 20/64 |
| 2018/0240180 A1* | 8/2018 | Glaser | G07G 1/0081 |
| 2018/0285852 A1 | 10/2018 | Matsui | |
| 2019/0026999 A1 | 1/2019 | Kinno et al. | |
| 2019/0043118 A1* | 2/2019 | Keeler | G06F 3/011 |
| 2019/0073880 A1* | 3/2019 | Nobuoka | G06F 18/22 |
| 2019/0130618 A1* | 5/2019 | Todasco | G06F 3/04886 |
| 2019/0139375 A1* | 5/2019 | Herring | G06V 40/10 |
| 2019/0228448 A1* | 7/2019 | Bleicher | G06Q 30/0631 |
| 2019/0303902 A1 | 10/2019 | Sanchez-Llorens et al. | |
| 2020/0302510 A1* | 9/2020 | Chachek | G06V 20/52 |
| 2020/0334650 A1* | 10/2020 | Song | G06K 7/1491 |
| 2020/0342208 A1* | 10/2020 | Srivastava | G06T 7/194 |
| 2020/0401576 A1* | 12/2020 | Yerli | G06F 9/46 |
| 2021/0012577 A1* | 1/2021 | Stansell | G06F 3/011 |
| 2021/0133850 A1* | 5/2021 | Ayush | G06N 3/08 |
| 2021/0142379 A1* | 5/2021 | Bleicher | G01B 11/24 |
| 2021/0174431 A1* | 6/2021 | Dhankhar | G06Q 30/0641 |
| 2021/0272117 A1* | 9/2021 | Ene | G06Q 20/327 |
| 2021/0383461 A1* | 12/2021 | Andon | H04W 4/00 |
| 2024/0095709 A1* | 3/2024 | Srivastava | G07G 1/0063 |
| 2025/0218257 A1* | 7/2025 | Britt | G06T 7/50 |

FOREIGN PATENT DOCUMENTS

| | | | | |
|---|---|---|---|---|
| CN | 112005196 A | * | 11/2020 | ........ G06Q 30/0631 |
| CN | 211906348 U | * | 11/2020 | |
| CN | 119107144 A | * | 12/2024 | .......... G06T 19/006 |
| JP | 2006-285804 | | 10/2006 | |
| JP | 2006285804 A | * | 10/2006 | |
| JP | 2017-068713 | | 4/2017 | |
| JP | 2019-061453 | | 4/2019 | |
| KR | 101894022 B1 | * | 8/2018 | .............. G06F 3/01 |
| WO | 2017/126254 | | 7/2017 | |

* cited by examiner

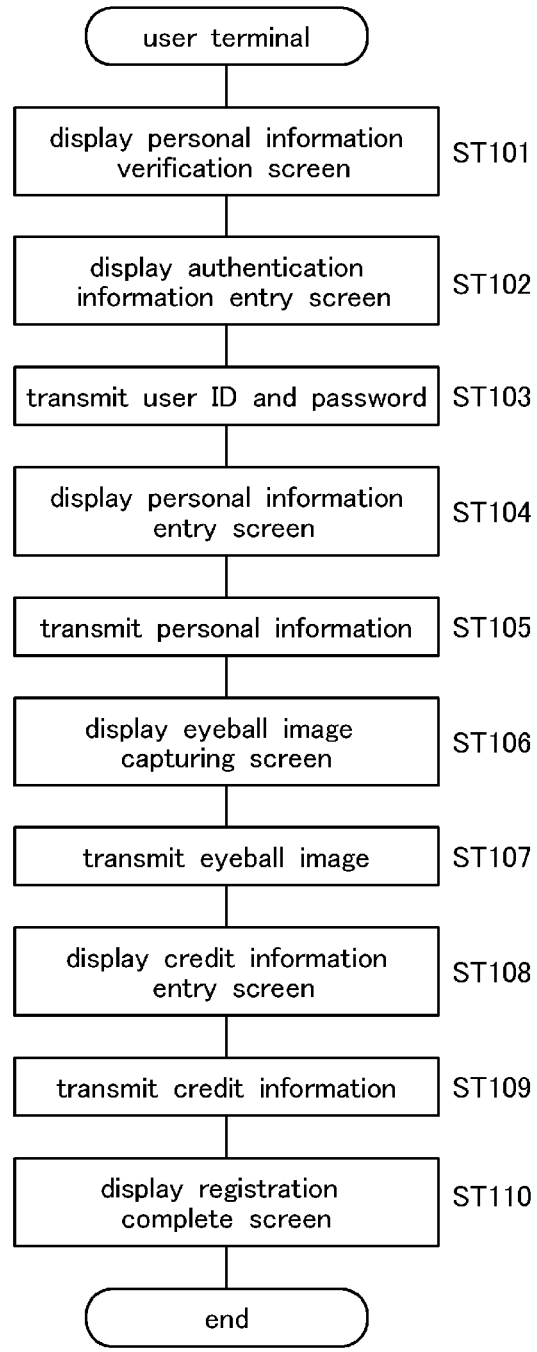

COST CALCULATION AND PAYMENT DEVICE, COST CALCULATION AND PAYMENT SYSTEM, AND COST CALCULATION AND PAYMENT METHOD

TECHNICAL FIELD

The present disclosure relates to a cost calculation and payment device which recognizes the merchandise items selected by a user in a sales area and performs a process related to calculation and payment of the cost thereof, and a cost calculation and payment system and a cost calculation and payment method using the cost calculation and payment device.

BACKGROUND ART

In a retail store such as a convenience store or a supermarket, a store clerk performs a work of registering the merchandise items that a customer wishes to purchase in a POS terminal, thereafter the POS terminal performs a cost calculation process and presents the cost of the merchandise items to the customer, and the store clerk performs the work for checkout (payment) to receive payment made by the customer. In recent years, various technologies for promoting the sales of merchandise by using the POS terminal are proposed.

As such a technology for promoting the sales of merchandise by using a POS terminal, conventionally, there is known a technology which captures an image of the customer making checkout at the cashier counter, acquires information related to attributes (such as sex and age group) of the customer, selects, based on the attributes of the customer, a merchandise item recommended to the customer, and displays the recommended merchandise item on a customer display of the POS terminal (see Patent Document 1).

PRIOR ART DOCUMENT(S)

Patent Document(s)

Patent Document 1: JP2017-68713A

SUMMARY OF THE INVENTION

Task to be Accomplished by the Invention

In the conventional technology, the customer can perform an operation of purchasing the recommended merchandise item by using the touch panel function of the customer display. Therefore, cost calculation of the recommended merchandise item is carried out together with the merchandise items brought to the cashier counter by the customer, and the customer can purchase merchandise items non-existent in the store along with merchandise items existent in the store.

However, in the conventional technology, there is a problem that only the image or the like of the recommended merchandise item is displayed on the display, and the customer cannot sufficiently check the merchandise item to purchase. Also, the customer only operates a purchase button when deciding to purchase, and there is a problem that the customer cannot fully get the real feeling as purchasing merchandise items in a physical store.

Thus, a primary object of the present disclosure is to provide a cost calculation and payment device, a cost calculation and payment system, and a cost calculation and payment method which can enhance convenience for the user by allowing the user to purchase, in a real store, merchandise items non-existent in the store in addition to merchandise items existent in the store and can allow the user to sufficiently check the merchandise items non-existent in the store as with the merchandise items existent in the store and to fully get the real feeling as purchasing merchandise items in a physical store.

Means to Accomplish the Task

A cost calculation and payment device of the present disclosure is a cost calculation and payment device for performing a process related to cost calculation and payment for merchandise items selected by a user in a store, the device comprising: a main body having a placement portion on which a real merchandise item selected by the user in a sales area is to be placed; a camera configured to capture an image of the real merchandise item placed on the placement portion; a controller configured to recognize the target merchandise item based on a merchandise image acquired by image capture performed by the camera and to perform a process related to cost calculation and payment; and a display configured to display cost calculation result and payment result acquired by the controller, wherein, in response to the user's operation of selecting a virtual merchandise item which is displayed as a virtual object in a superimposed manner in a predetermined area in the store as a real space, the controller further performs cost calculation of the virtual merchandise item selected by the user together with the recognized real merchandise item.

Also, a cost calculation and payment system of the present disclosure is a cost calculation and payment system for performing a process related to cost calculation and payment for merchandise items selected by a user in a store, the system comprising: a cost calculation and payment device having a placement portion on which a real merchandise item selected by the user in a sales area is to be placed, the cost calculation and payment device being configured to capture an image of the merchandise item placed on the placement portion, to recognize the target merchandise item based on a merchandise image acquired by the image capture, to perform a process related to cost calculation and payment, and to display results of the cost calculation and payment; a virtual object display device configured to display a virtual object in a superimposed manner in a real space; and a virtual object control device configured to control the virtual object display device to display a virtual merchandise item as the virtual object in a superimposed manner in a predetermined area in the store as the real space and to detect the user's operation of selecting the virtual merchandise item, wherein, in response to the user's operation of selecting the virtual merchandise item, the cost calculation and payment device performs cost calculation of the virtual merchandise item selected by the user together with the recognized real merchandise item.

Also, a cost calculation and payment method of the present disclosure is a cost calculation and payment method for performing a process related to cost calculation and payment for merchandise items selected by a user in a store, wherein a virtual object control device controls a virtual object display device, which is configured to display a virtual object in a superimposed manner in a real space, to display a virtual merchandise item as the virtual object in a superimposed manner in a store as the real space, and detects the user's operation of selecting the virtual merchandise item, and a cost calculation and payment device captures an image of a real merchandise item selected by the user in a sales area and placed on a placement portion, recognizes the target merchandise item based on a merchandise image acquired by the image capture, and, in response to the user's operation of selecting the virtual merchandise item, performs cost calculation of the virtual merchandise item selected by the user together with the recognized real merchandise item.

Effect of the Invention

According to the present disclosure, in addition to the recognized real merchandise items, virtual merchandise items, which are non-existent in the store, can be selected for checkout with a similar feeling as when evaluating real merchandise items in an ordinary store (browsing the merchandise exhibited on the shelves), and therefore, it is possible to enhance purchase opportunities for customers while minimizing the store inventory.

BRIEF DESCRIPTION OF THE DRAWINGS

FIG. 9 is a flowchart showing an operating procedure of a user terminal 11 at the time of user registration.

MODE(S) FOR CARRYING OUT THE INVENTION

Figure 1:
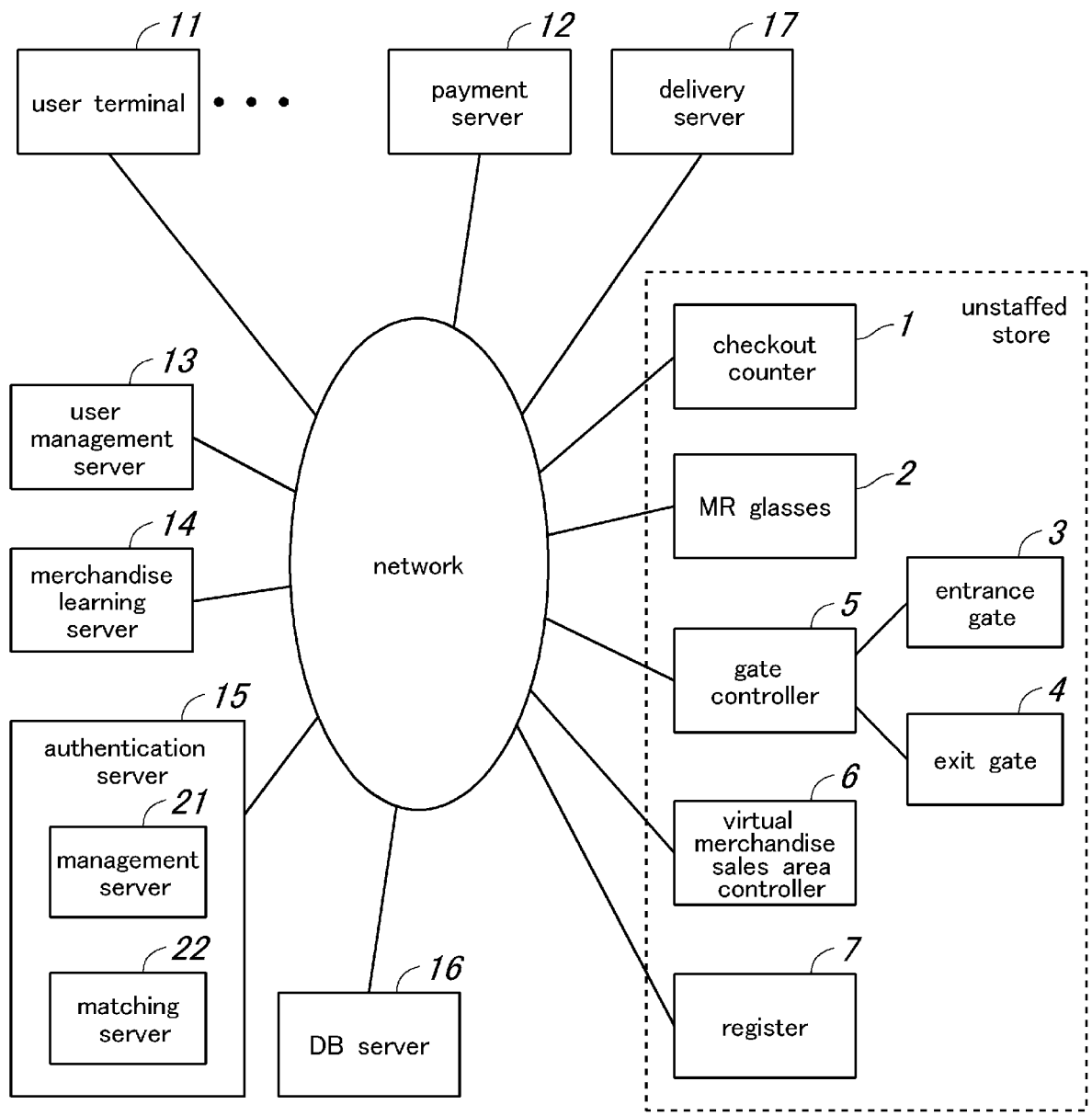
FIG. 1 is an overall configuration diagram of an unstaffed store system according to the present embodiment.

The first aspect of the invention made to solve the above problem provides a cost calculation and payment device for performing a process related to cost calculation and payment for merchandise items selected by a user in a store, the device comprising: a main body having a placement portion on which a real merchandise item selected by the user in a sales area is to be placed; a camera configured to capture an image of the real merchandise item placed on the placement portion; a controller configured to recognize the target merchandise item based on a merchandise image acquired by image capture performed by the camera and to perform a process related to cost calculation and payment; and a display configured to display cost calculation result and payment result acquired by the controller, wherein, in response to the user's operation of selecting a virtual merchandise item which is displayed as a virtual object in a superimposed manner in a predetermined area in the store as a real space, the controller further performs cost calculation of the virtual merchandise item selected by the user together with the recognized real merchandise item.

According to this, in addition to the recognized real merchandise items, merchandise items non-existent in the store can be selected for checkout from virtual merchandise items exhibited on the shelves with a similar feeling as when evaluating real merchandise items in an ordinary store, and therefore, it is possible to enhance purchase opportunities for customers while minimizing the store inventory.

In the second aspect of the invention, the controller controls a virtual object display device to display the virtual merchandise item as the virtual object in a superimposed manner on the placement portion as the real space such that the virtual merchandise item is positioned alongside the real merchandise item placed on the placement portion.

According to this, the user can visually check the real merchandise item, which is existent in the store, and the virtual merchandise item, which is non-existent in the store, in a state positioned side by side on the placement portion. Therefore, the user can sufficiently check the merchandise items non-existent in the store as with the merchandise items existent in the store and can fully get the real feeling as purchasing merchandise items in a physical store.

In the third aspect of the invention, when the cost calculation or the payment related to purchase items including the virtual merchandise item is completed, the controller performs a process related to delivery of an actual item of the virtual merchandise item.

According to this, it is possible to promptly deliver the actual item of the virtual merchandise item purchased by the user.

The fourth aspect of the invention provides a cost calculation and payment system for performing a process related to cost calculation and payment for merchandise items selected by a user in a store, the system comprising: a cost calculation and payment device having a placement portion on which a real merchandise item selected by the user in a sales area is to be placed, the cost calculation and payment device being configured to capture an image of the merchandise item placed on the placement portion, to recognize the target merchandise item based on a merchandise image acquired by the image capture, to perform a process related to cost calculation and payment, and to display results of the cost calculation and payment; a virtual object display device configured to display a virtual object in a superimposed manner in a real space; and a virtual object control device configured to control the virtual object display device to display a virtual merchandise item as the virtual object in a superimposed manner in a predetermined area in the store as the real space and to detect the user's operation of selecting the virtual merchandise item, wherein, in response to the user's operation of selecting the virtual merchandise item, the cost calculation and payment device performs cost calculation of the virtual merchandise item selected by the user together with the recognized real merchandise item.

According to this, similarly to the first aspect of the invention, in addition to the recognized real merchandise items, virtual merchandise items, which are non-existent in the store, can be selected for checkout with a similar feeling as when evaluating real merchandise items in an ordinary store (browsing the merchandise exhibited on the shelves), and therefore, it is possible to enhance purchase opportunities for customers while minimizing the store inventory.

In the fifth aspect of the invention, the cost calculation and payment device controls the virtual object display device to display the virtual merchandise item in a superimposed manner on the placement portion as the real space such that the virtual merchandise item is positioned alongside the real merchandise item placed on the placement portion.

According to this, the user can visually check the real merchandise item, which is existent in the store, and the virtual merchandise item, which is non-existent in the store, in a state positioned side by side on the placement portion. Therefore, the user can sufficiently check the merchandise items non-existent in the store as with the merchandise items existent in the store and can fully get the real feeling as purchasing merchandise items in a physical store.

In the sixth aspect of the invention, the virtual object display device is a wearable device configured to be worn on a head of the user and to display the virtual object in a superimposed manner on a real field of vision of the user.

According to this, the user can do shopping for the virtual merchandise item with a sense of reality close to the actual item.

In the seventh aspect of the invention, the virtual object display device is provided with a sensor configured to detect a motion of the user and recognizes a hand gesture of the user based on a detection result by the sensor, and the virtual object control device detects the user's operation of selecting the virtual merchandise item based on a recognition result of the hand gesture.

According to this, the user can select the virtual merchandise item easily. Note that besides this, configuration may be made such that the operation is performed with a controller or voice of the user.

The eighth aspect of the invention provides a cost calculation and payment method for performing a process related to cost calculation and payment for merchandise items selected by a user in a store, wherein a virtual object control device controls a virtual object display device, which is configured to display a virtual object in a superimposed manner in a real space, to display a virtual merchandise item as the virtual object in a superimposed manner in a store as the real space, and detects the user's operation of selecting the virtual merchandise item, and a cost calculation and payment device captures an image of a real merchandise item selected by the user in a sales area and placed on a placement portion, recognizes the target merchandise item based on a merchandise image acquired by the image capture, and, in response to the user's operation of selecting the virtual merchandise item, performs cost calculation of the virtual merchandise item selected by the user together with the recognized real merchandise item.

According to this, similarly to the first aspect of the invention, in addition to the recognized real merchandise items, virtual merchandise items, which are non-existent in the store, can be selected for checkout with a similar feeling as when evaluating real merchandise items in an ordinary store (browsing the merchandise exhibited on the shelves), and therefore, it is possible to enhance purchase opportunities for customers while minimizing the store inventory.

In the ninth aspect of the invention, the cost calculation and payment device controls the virtual object display device to display the virtual merchandise item in a superimposed manner on the placement portion as the real space such that the virtual merchandise item is positioned alongside the real merchandise item placed on the placement portion.

According to this, the user can visually check the real merchandise item, which is existent in the store, and the virtual merchandise item, which is non-existent in the store, in a state positioned side by side on the placement portion. Therefore, the user can sufficiently check the merchandise items non-existent in the store as with the merchandise items existent in the store and can fully get the real feeling as purchasing merchandise items in a physical store.

In the following, embodiments of the present disclosure will be described with reference to the drawings.

FIG. 1 is an overall configuration diagram of an unstaffed store system according to the present embodiment.

This unstaffed store system (cost calculation and payment system) is for allowing a retail store, such as a convenience store or a supermarket, to be unstaffed or achieving a retail store in which there is no store clerk for performing cost calculation and receiving payment.

The unstaffed store system is provided with a checkout counter 1 (cost calculation and payment device), pairs of MR glasses 2 (virtual object display devices), an entrance gate 3, an exit gate 4, a gate controller 5, a virtual merchandise sales area controller 6 (virtual object control device), and a register 7. The checkout counter 1, the MR glasses 2, the entrance gate 3, the exit gate 4, the gate controller 5, the virtual merchandise sales area controller 6, and the register 7 are provided in an unstaffed store.

Further, the unstaffed store system includes user terminals 11, a payment server 12, a user management server 13, a merchandise learning server 14, an authentication server 15, a DB server 16, and a delivery server 17.

The user terminals 11, the payment server 12, the user management server 13, the merchandise learning server 14, the authentication server 15, the DB server 16, and the delivery server 17 as well as the checkout counter 1, the MR glasses 2, the gate controller 5, the virtual merchandise sales area controller 6, and the register 7, which are provided in the unstaffed store, are connected to each other via a network such as the Internet and a LAN.

Note that the user management server 13, the merchandise learning server 14, the authentication server 15, and the DB server 16 may be installed in the unstaffed store, for example, in a backyard annexed to the sales area, but may also be installed in places remote from the unstaffed store, for example, in the headquarters of a party operating the unstaffed store.

The checkout counter 1 performs a process related to cost calculation and payment (paying of the cost) of the merchandise the user has selected in the sales area of the unstaffed store. In the present embodiment, as a process related to the cost calculation, the checkout counter 1 identifies items of merchandise based on the captured images of the merchandise items by object recognition (merchandise recognition process) and calculates the total amount to be paid based on the price (unit price) and number of each merchandise item (cost calculation). Also, as a process related to the payment, the checkout counter 1 requests the authentication server 15 to perform iris authentication, and if the iris authentication is successful, requests the payment server 12 to perform a payment process via the user management server 13.

A pair of MR glasses 2 is a wearable device configured to be worn on the head of the user and to display virtual objects in a superimposed manner on the real field of vision of the user. In the present embodiment, virtual merchandise items (virtual 3D objects of merchandise items) which are non-existent in the store and a virtual exhibition shelf (a virtual 3D object of an exhibition shelf) for exhibiting the virtual merchandise items are displayed by the MR glasses 2 in the store in a superimposed manner in a virtual merchandise sales area as a real space. Also, for iris authentication to identify the user, the MR glasses 2 acquire iris information by capturing an image of an eyeball of the user.

The entrance gate 3 restricts entry of users into the store. The exit gate 4 restricts exit of users from the store. The gate controller 5 performs a process related to iris authentication for permitting entry of each user into the store, and controls opening and closing of the entrance gate 3 according to the result of iris authentication. The gate controller 5 performs a process related to iris authentication for confirming exit of each user from the store, and controls opening and closing of the exit gate 4 according to the result of iris authentication. Note that password authentication may be performed as a backup when the user cannot enter or exit from the store due to failure of iris authentication.

The virtual merchandise sales area controller 6 controls the MR glasses 2 of the user to display virtual merchandise items and a virtual exhibition shelf for exhibiting the virtual merchandise items in the virtual merchandise sales area. Also, the virtual merchandise sales area controller 6 acquires a hand gesture recognition result from the MR glasses 2 and, based on the recognition result, detects an operation of the user such as an operation of selecting a virtual merchandise item. Further, in response to the selection operation by the user, the virtual merchandise sales area controller 6 registers the virtual merchandise item in a shopping list. The information of the shopping list is provided from the virtual merchandise sales area controller 6 to the checkout counter 1.

The register 7 is a device with which the user performs an operation related to user registration (registration of member information and an eyeball image for iris authentication) necessary for the user to use the present system, and is constituted of a tablet terminal, for example, in which an application for user registration is installed.

Similarly to the register 7, the user terminal 11 is a device with which the user performs an operation related to user registration (registration of member information and an eyeball image for iris authentication) necessary for the user to use the present system and manages purchase history (receipt information), and is constituted of a smartphone or a tablet terminal in which a user application is installed.

The payment server 12 is a server run by a payment service company (a credit company or the like). This payment server 12 executes, in response to the payment request from the checkout counter 1, the payment process related to the cost of the merchandise purchased by the user. Note that the payment server 12 may be a server run by a payment agency company (payment agency server).

The user management server 13 functions as a login server that manages the login of the users and performs password authentication. Also, the user management server 13 functions as a payment and delivery interface server that interfaces between the checkout counter 1 and each of the payment server 12 and the delivery server 17.

The merchandise learning server 14 constructs a merchandise recognition engine, which is installed in the checkout counter 1, through machine learning such as deep learning. In this merchandise learning server 14, machine learning is conducted with the merchandise images acquired beforehand by capturing the images of the merchandise items to be registered being input information and the merchandise identification information of each merchandise item (such as the name of each merchandise item) being output information, thereby constructing a database for merchandise recognition.

The authentication server 15 includes a management server 21 and a matching server 22. The management server 21 accumulates and manages the information, such as the name and iris information (iris ID, iris image), of the registered users. The matching server 22 performs iris authentication in response to a request for iris authentication from the checkout counter 1 and the gate controller 5. In this iris authentication, the matching server 22 acquires the eyeball image of the user in question from the checkout counter 1 and the gate controller 5, generates the iris features of the user in question from the eyeball image, and performs iris matching by comparing the iris features of the user in question with the iris features of the registrants (registered users) stored in the own device, thereby to determine whether the user in question is one of the registrants (1-to-N authentication).

The DB server 16 accumulates and manages various information. Specifically, as user management information, information such as the payment ID, iris ID, user ID, password, and office code of each user is registered in the database. Also, as merchandise master information, information such as identification information of each merchandise item (merchandise name, merchandise code, etc.) is registered in the database. Further, as purchase log information, information such as the user ID of each user and the name and price of each merchandise item purchased by the user is registered in the database.

The delivery server 17 manages delivery of merchandise items at the delivery department (delivery center). Specifically, similarly to the case of EC shopping, the delivery server 17 manages works of securing merchandise items present in the warehouse, packing the merchandise items, and requesting a delivery company to deliver the merchandise items. In the present embodiment, when the procedure for purchasing the virtual merchandise items (cost calculation and payment of the merchandise items to be purchased) is completed at the checkout counter 1, arrangement information for instructing delivery of actual items of the virtual merchandise items is transmitted from the checkout counter 1 to the delivery server 17 via the user management server 13, and the delivery server 17 performs a process for starting the delivery work based on the arrangement information.

Note that in the present embodiment, the checkout counter 1 performs the merchandise recognition process, but the merchandise recognition process may be performed by an external server.

Also, in the present embodiment, the gate controller 5 is provided and this gate controller 5 controls the entrance gate 3 and the exit gate 4, but the checkout counter 1 may have the function of the gate controller 5.

Further, in the present embodiment, the virtual merchandise sales area controller 6 is provided and this virtual merchandise sales area controller 6 controls the MR glasses 2 to display virtual merchandise items in the virtual merchandise sales area, but the checkout counter 1 may have the function of the virtual merchandise sales area controller 6.

Also, in the present embodiment, the MR glasses 2 configured to be worn by the user on the head are used as an MR (Mixed Reality) device configured to display virtual merchandise items in a superimposed manner in the real space in the virtual merchandise sales area, but the MR device is not limited to such a device configured to be worn by the user on the body. For example, a smartphone may be used as the MR device. In this case, configuration may be made such that when the camera of the smartphone is directed to the virtual merchandise sales area, a virtual exhibition shelf appears on the image captured by the camera and displayed on the display of the smartphone, and upon operation (touch operation) of selecting a virtual merchandise item exhibited on the virtual exhibition shelf, the virtual merchandise item is selected. Further, the device configured to display virtual merchandise items in a superimposed manner in the real space in the virtual merchandise sales area may be an AR (Augmented Reality) device besides the MR device.

Figure 2:
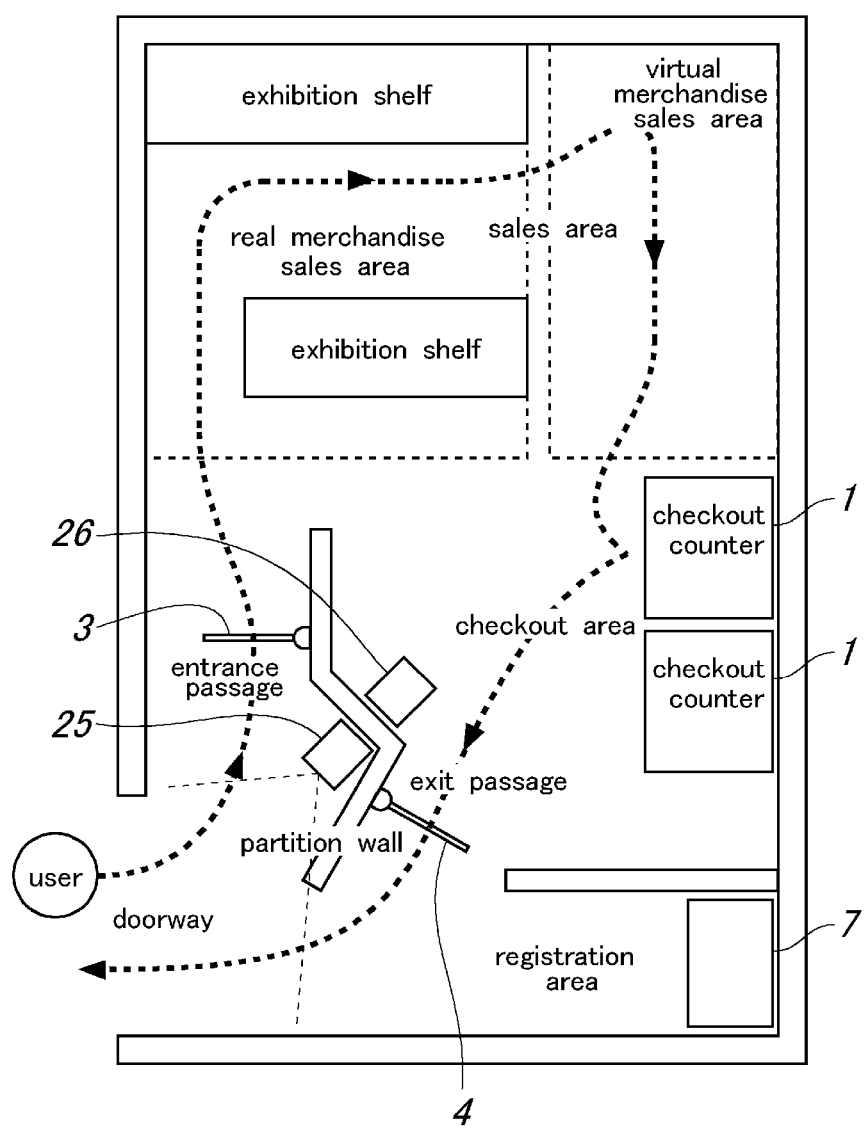
FIG. 2 is a plan view showing a layout of the unstaffed store.

Next, a description will be made of the unstaffed store. FIG. 2 is a plan view showing the layout of the unstaffed store.

The unstaffed store is provided with a doorway, a sales area, a checkout area, and a registration area.

In the vicinity of the doorway, an entrance passage and an exit passage separated by a partition wall are provided. In the entrance passage, the entrance gate 3 is installed. Also, in the vicinity of the entrance passage, an MR glass lending table 25, on which pairs of MR glasses 2 to be lent to users are placed, is installed. In the exit passage, the exit gate 4 is installed. Also, in the vicinity of the exit passage, an MR glass return table 26, where users should return the MR glasses 2, is installed.

In the sales area, a real merchandise sales area and a virtual merchandise sales area are provided. In the real merchandise sales area, exhibition shelves on which real merchandise items (existent merchandise items) are exhibited are installed. In the virtual merchandise sales area, virtual merchandise items (virtual objects of merchandise items) in an exhibited state are displayed by the MR glasses 2 worn by the user.

The checkout area is provided near the exit passage. In the checkout area, multiple checkout counters 1 are installed.

The registration area is provided in a position adjacent to the checkout area and directly accessible from the doorway. In the registration area, the register 7 is installed.

When the user enters the store through the doorway, the user goes into the entrance passage, and wears on the head a pair of MR glasses 2 on the MR glass lending table 25. At this time, the gate controller 5 acquires the iris information from the MR glasses 2 of the user and makes the authentication server 15 perform iris authentication, and if the iris authentication is successful, opens the entrance gate 3 so that the user can enter the sales area. Note that the MR glasses 2 may be configured such that when wearing thereof by the user is detected, a login screen is displayed, and when the person is identified by the iris authentication, the user's name is displayed.

Then, the user enters the sales area through the entrance passage, evaluates the merchandise items exhibited in the sales area, and selects a merchandise item(s) to purchase. At this time, in the real merchandise sales area, the user takes out the real merchandise item(s) to purchase from among the real merchandise items exhibited on the exhibition shelves (picking up of a real merchandise item(s)). Also, in the virtual merchandise sales area, a virtual exhibition shelf is displayed by the MR glasses 2. The user performs an operation of selecting a virtual merchandise item(s) to purchase from among the virtual merchandise items exhibited on the virtual exhibition shelf (picking up of a virtual merchandise item(s)).

Next, the user moves to the checkout area and performs an operation for cost calculation and payment at the checkout counter 1. At this time, upon placement of the real merchandise items taken out by the user from the exhibition shelves in the real merchandise sales area on the checkout counter 1, the cost calculation is performed, and then the iris authentication and the password authentication are performed. If the iris authentication and the password authentication are successful, payment is executed. Also, in the case where the user selects a virtual merchandise item(s) in the virtual merchandise sales area, the cost calculation and payment are performed for the merchandise items including the virtual merchandise item(s) selected by the user.

Thereafter, the user moves to the exit passage to exit from the store. At this time, the gate controller 5 acquires the iris information from the MR glasses 2 of the user and makes the authentication server 15 perform iris authentication, and if the iris authentication is successful, opens the exit gate 4 so that the user can exit from the store through the doorway. The user returns the MR glasses 2 to the MR glass return table 26, and then exits from the store through the exit passage.

Note that in the present embodiment, the MR glasses 2 are lent to the user at the store, but it is also possible to use the MR glasses 2 regularly used by the user.

Also, in the present embodiment, when the user enters the store, iris authentication is performed based on the iris information of the user acquired by the MR glasses 2, but password authentication may be performed based on the user ID and the password. In this case, configuration may be made such that an entry screen is displayed by the MR glasses 2, and the user ID and the password are entered by an operation of a virtual keyboard.

Also, the present embodiment relates to an unstaffed store system and is intended for use in an unstaffed store in which no store clerk is not present, but the system disclosed here (cost calculation and payment system) is for allowing the cost calculation and payment (checkout) of the merchandise items purchased by the user to be performed without a store clerk, and is not necessarily limited to use in the unstaffed store. Namely, the present invention may be used in a staffed store, in which there always is a store clerk, to reduce the burden of the store clerk in the staffed store. In this case, the checkout counter 1 functions as a self-service cash register. Also, a form in which an unstaffed store and a staffed store coexist may be possible. For example, there may be a case in which both unstaffed cash registers and staffed cash registers are installed in a single store. Also, there may be a case in which a single store is divided into an unstaffed area and a staffed area.

Figure 3:
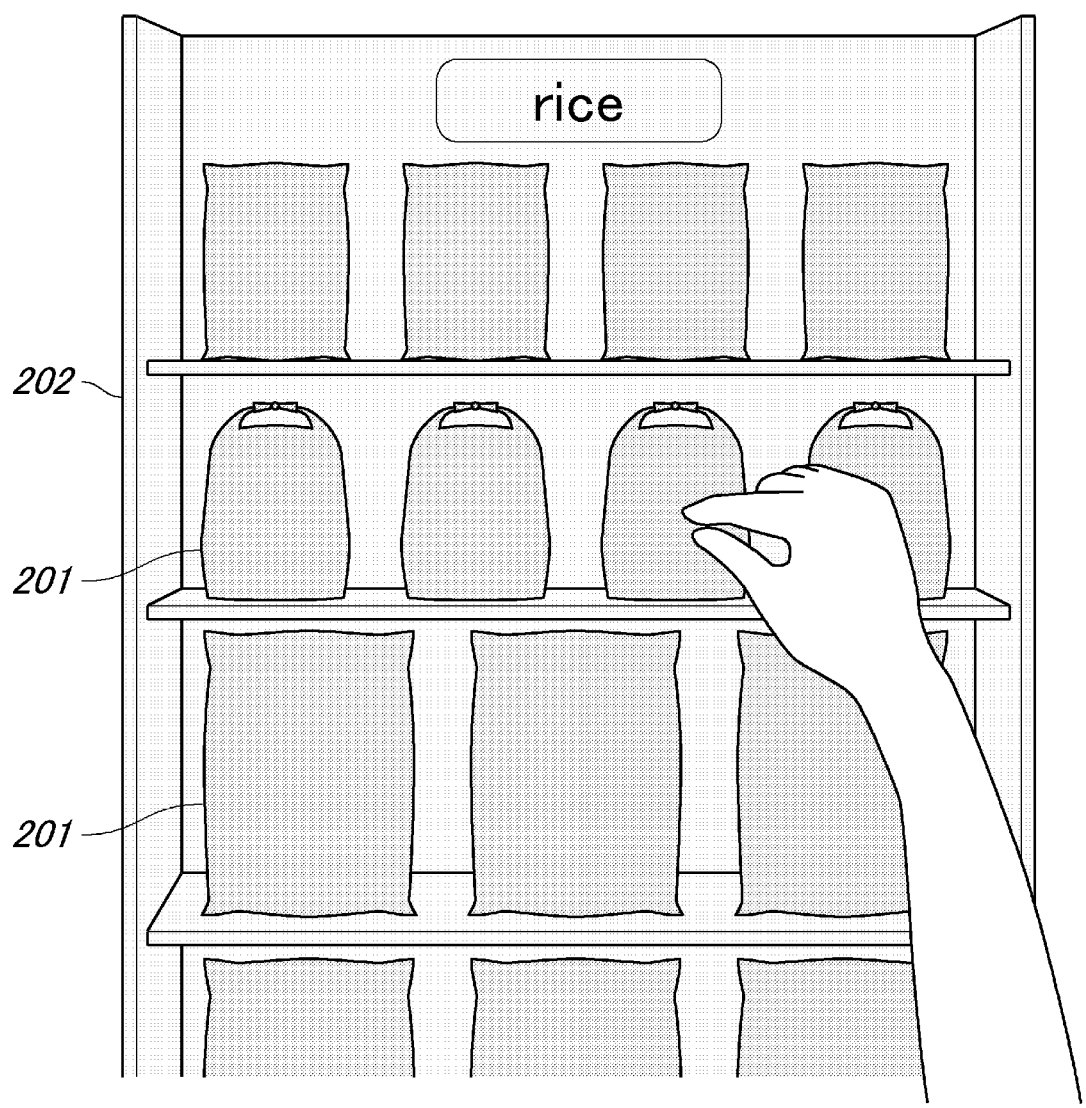
FIG. 3 is an explanatory diagram showing a display situation of virtual merchandise items in a virtual merchandise sales area and an operation situation to pick up the virtual merchandise items.

Next, a description will be made of display of virtual merchandise items in the virtual merchandise sales area and an operation of picking up the virtual merchandise items. FIG. 3 is an explanatory diagram showing a display situation of virtual merchandise items in the virtual merchandise sales area and an operation situation to pick up the virtual merchandise items.

The virtual merchandise sales area controller 6 controls the MR glasses 2 worn by the user to display virtual merchandise items 201 in a state exhibited on a virtual exhibition shelf 202 in the virtual merchandise sales area. Namely, the virtual merchandise items 201, which are virtual 3D objects of merchandise items, and the virtual exhibition shelf 202, which is a virtual 3D object of an exhibition shelf, are displayed in a superimposed manner in the virtual merchandise sales area as a real space.

The MR glasses 2 have a function of recognizing a hand gesture (hand motion) of the user. The virtual merchandise sales area controller 6 detects an operation represented by the hand gesture of the user based on the result of hand gesture recognition by the MR glasses 2 (hand tracking).

Specifically, with an operation represented by the hand gesture, the user can select a virtual merchandise item 201 displayed by the MR glasses 2. For example, the user can select a virtual merchandise item 201 with a motion picking the virtual merchandise item 201 with fingers. Also, configuration may be made such that with a pointing motion of the user, a virtual merchandise item 201 on an extension line of the finger is selected. When the user selects a virtual merchandise item 201, the virtual merchandise item 201 is registered in the shopping list.

Also, the number of virtual merchandise items 201 to be purchased may be specified according to an operation represented by a hand gesture of the user. For example, the operation of selecting the virtual merchandise item 201 may be performed with a right hand while the number of virtual merchandise items 201 to be purchased may be specified with a left hand. Specifically, the number of virtual merchandise items 201 to be purchased may be specified according to a method of representing a number with fingers (hand sign).

Also, the virtual merchandise items 201 on the virtual exhibition shelf 202 may be replaced according to an operation represented by a hand gesture of the user. For example, when a virtual exhibition shelf 202 for a certain merchandise category is displayed, a hand gesture of the user may cause a virtual exhibition shelf 202 for another merchandise category to be displayed. Specifically, with each motion of swiping a hand of the user (flip operation), the merchandise category of the virtual exhibition shelf 202 may be sequentially switched such as from beverages to sweets to instant foods (cup instant noodles or the like) and so on. Thereby, a wide variety of virtual merchandise items 201 can be exhibited without securing a large virtual merchandise sales area or even in a small store with limited space.

Further, the virtual merchandise items 201 on the virtual exhibition shelf 202 may be recommended merchandise items selected according to the user's attributes (sex, age, etc.), purchase history, etc.

Note that in the example shown in FIG. 3, the virtual exhibition shelf 202 on which the virtual merchandise items 201 are exhibited as virtual objects is displayed in the virtual merchandise sales area, but forms of exhibition methods different from that using the exhibition shelf, for example, exhibition methods in which the virtual merchandise items 201 are placed on a cart (exhibition table), a rotating table, etc. may also be possible. Further, various forms of exhibition methods which cannot be realized in the real space and are unique to the virtual space, for example, a form in which the virtual merchandise items 201 rotate in a state floated in the air, are possible.

Also, in the example shown in FIG. 3, the virtual exhibition shelf 202 for rice as one example of merchandise categories is displayed with an assumption that the store is a convenience store, a supermarket, or the like, but the store is not limited to stores of this type, and may be an apparel-related store, for example.

Further, in the present embodiment, the virtual merchandise items are displayed by the MR glasses 2 in the virtual merchandise sales area provided in the store, but the virtual merchandise items may be displayed in an area in the store other than the sales area. For example, while the user is doing an operation for cost calculation at the checkout counter 1, virtual merchandise items may be displayed around the checkout counter 1 by the MR glasses 2. In this case, merchandise items similar to those exhibited on an exhibition shelf installed next to the cashier counter (exhibition shelf next to the cash register) in the real store may be displayed as the virtual merchandise items. Also, the virtual merchandise items to be displayed may be selected based on the user information (attributes, purchase history, etc.) and/or the information on the merchandise items that the user is about to purchase.

Also, in the present embodiment, the sales area is divided into the real merchandise sales area and the virtual merchandise sales area (see FIG. 2), but it is also possible that, without dividing the sales area into the real merchandise sales area and the virtual merchandise sales area, the virtual merchandise items may be displayed by the MR glasses 2 in passages between the exhibition shelves for exhibiting the real merchandise items, for example.

Generally, in EC shopping, customers often search for a target merchandise item (desired merchandise item) before purchasing the merchandise item. Some of the EC shopping sites suggest best-selling merchandise items in accordance with the target merchandise item, but it is difficult to enable the user to do shopping with a similar feeling as when browsing in the store. According to the present embodiment, in addition to the recognized real merchandise items, virtual merchandise items, which are non-existent in the store, can be selected for checkout with a similar feeling as when evaluating real merchandise items in an ordinary store (browsing the merchandise exhibited on the shelves), and therefore, it is possible to enhance purchase opportunities for customers while minimizing the store inventory.

Also, in the present embodiment, flexible merchandise exhibition (shelf assignment) can be achieved; for example, concept of freezer shelves, refrigerated shelves, and normal temperature shelves disappears and it becomes possible to exhibit room temperature merchandise next to refrigerated merchandise. Thus, arrangement of merchandise items with a novel layout that cannot be imagined in ordinary stores that deal with real merchandise items becomes possible.

Figure 4A:
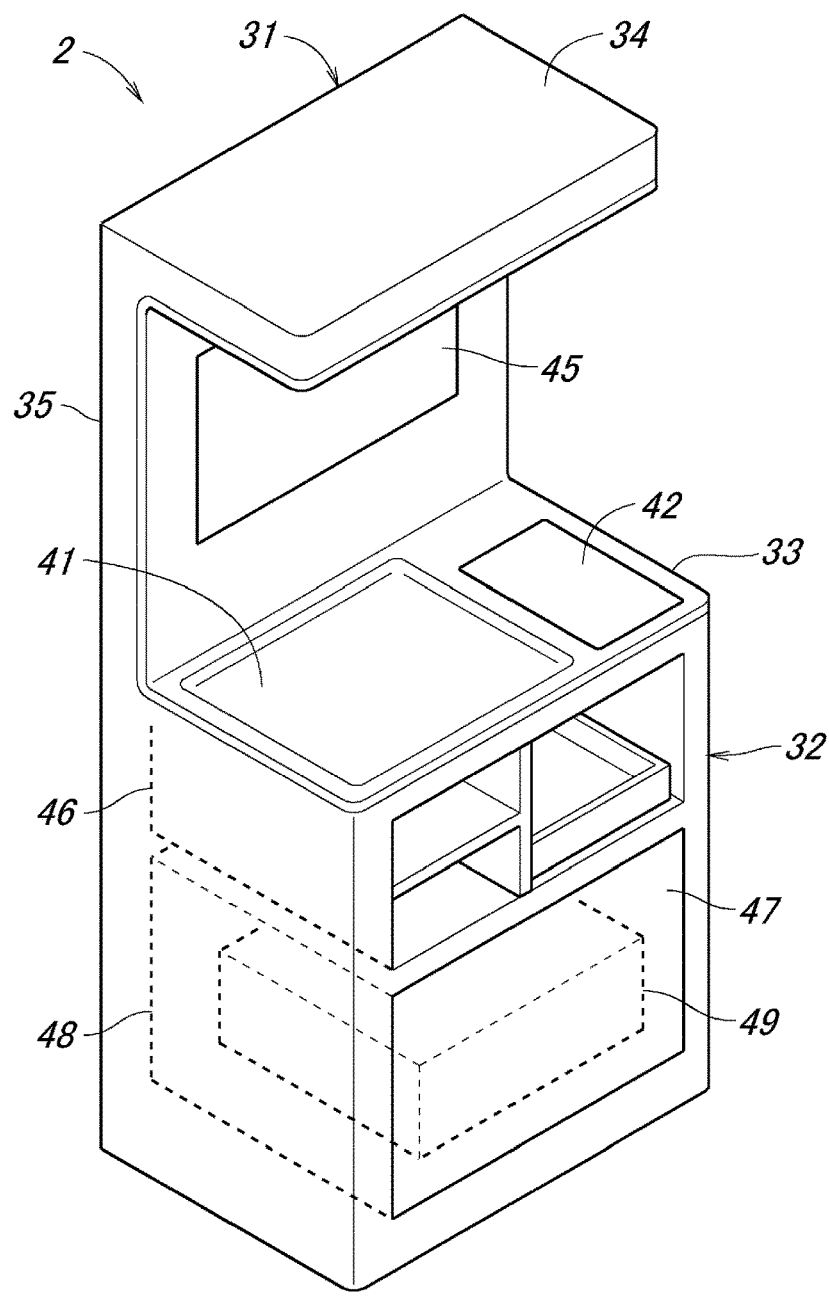
FIGS. 4(A)-4(B) are perspective views showing an appearance of a checkout counter 1.
Figure 4B:
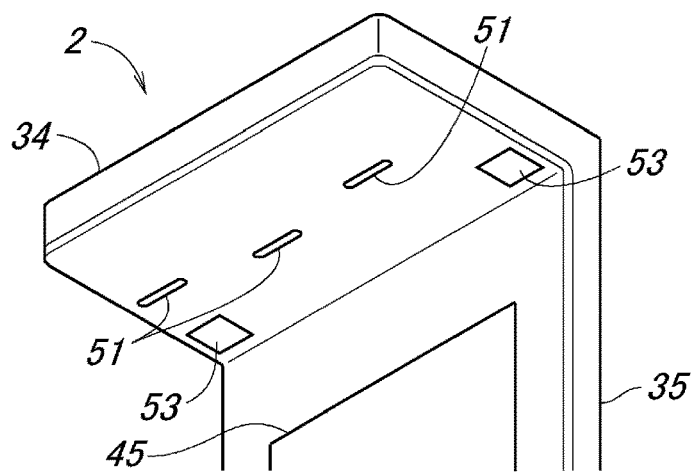

Next, a description will be made of the checkout counter 1. FIG. 4 is a perspective view showing an appearance of the checkout counter 1. FIG. 4(A) shows the whole checkout counter 1, and FIG. 4(B) shows an upper wall portion 34 from obliquely below.

As shown in FIG. 4(A), a main body 31 of the checkout counter 1 includes a box-shaped portion 32, a top plate portion 33, an upper wall portion 34, and a rear wall portion 35. The top plate portion 33 is provided on an upper side of the box-shaped portion 32. The rear wall portion 35 is provided to protrude upward from a rear side of the box-shaped portion 32. The upper wall portion 34 is provided to protrude forward from an upper end of the rear wall portion 35 like eaves.

The top plate portion 33 is provided with a tray 41 (placement portion) on which the user places the merchandise items to purchase (the merchandise items selected in the sales area). With the user simply placing the merchandise items side by side on the tray 41, the placed merchandise items are identified by object recognition, and cost calculation, or calculation of the amount of money to be paid, is performed based on the unit price of each merchandise item. Note that the tray 41 is formed in the top plate portion 33 to be recessed in a dish shape so that the user can easily understand the range within which the merchandise items should be placed.

In addition, the top plate portion 33 is provided with a touch panel display 42. The touch panel display 42 displays the merchandise recognition result, namely, the merchandise items for which the cost calculation is executed, and when there is no error in the merchandise recognition result, the user can perform an operation related to iris authentication and password authentication. Also, when there is an error in the merchandise recognition result, the user can perform an operation for correcting the merchandise items for which the cost calculation is executed.

The box-shaped portion 32 is provided with a first storing part 46 (rack) having an open front side and a second storing part 48 having a front side closed by a door 47. In the first storing part 46, accessory items of merchandise are stored. These accessory items are provided to the users for free and the users can take them home freely. Specifically, the accessory items include shopping bags, cutleries (spoons, forks, etc.) and the like. In the second storing part 48, a controller 49 (PC) for controlling the touch panel display 42, etc. is stored.

The rear wall portion 35 is provided with a display 45. This display 45 functions as a digital signage, and displays content such as a store guide or advertisement of merchandise at all times.

As shown in FIG. 4(B), the upper wall portion 34 is provided with cameras 51. These cameras 51 capture images of the merchandise items placed on the tray 41 of the top plate portion 33. Here, three cameras 51 are provided. The central camera 51 captures images of the merchandise items placed on the tray 41 from directly above, and the captured images are used for the purpose of detecting the positions of the merchandise items placed on the tray 41. The two cameras 51 on respective sides capture images of the merchandise items placed on the tray 41 from obliquely above, and the captured images are used for the purpose of recognizing the merchandise items (merchandise names) placed on the tray 41.

Also, speakers 53 are provided on the upper wall portion 34. The speakers 53 output voices for responding to the users. For example, a guide voice for guiding how to operate is outputted from the speakers 53.

Figure 5:
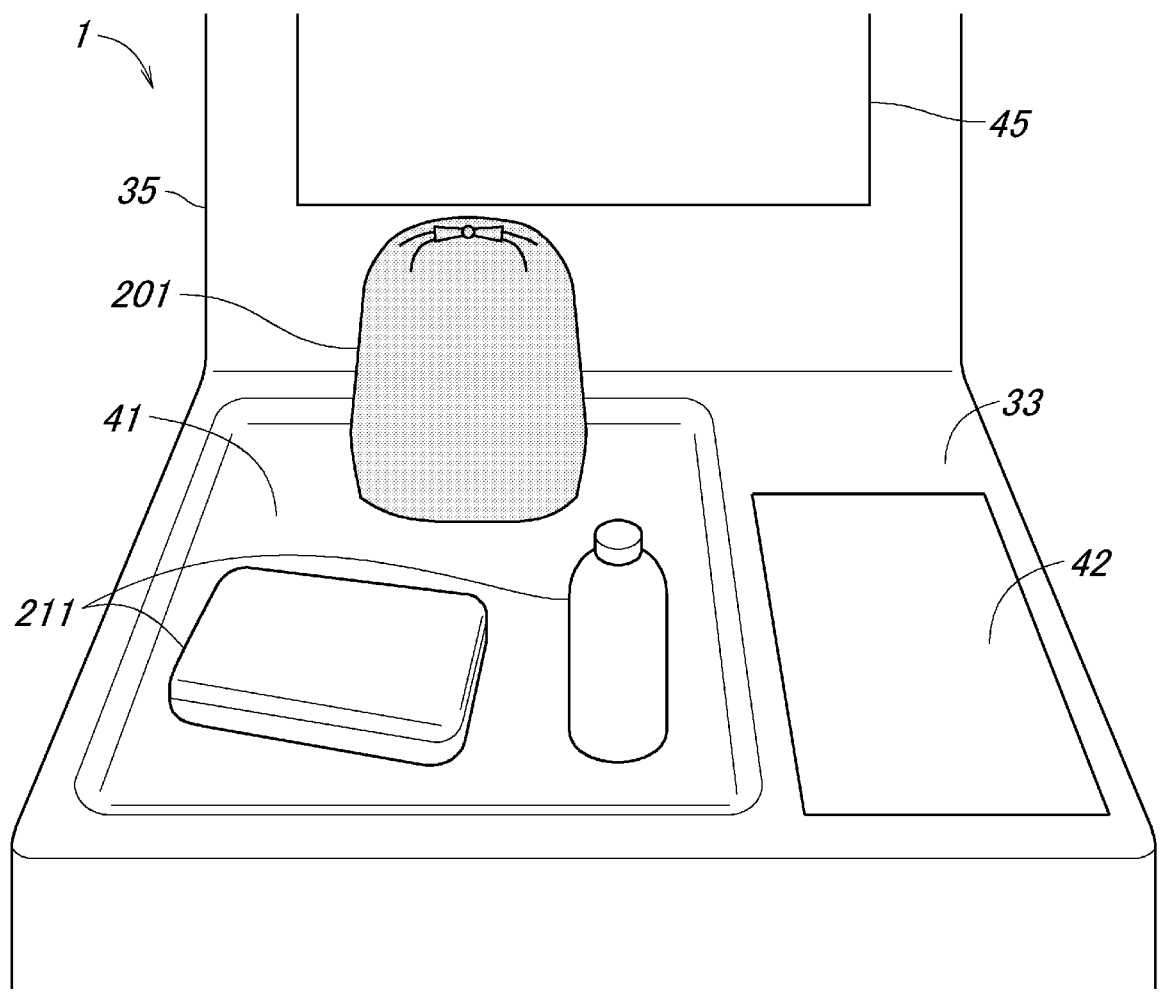
FIG. 5 is an explanatory diagram showing a placement situation of real merchandise items and a display situation of virtual merchandise items at the checkout counter 1.

Next, a description will be made of placement of real merchandise item(s) and display of virtual merchandise item(s) at the checkout counter 1. FIG. 5 is an explanatory diagram showing a placement situation of real merchandise items and a display situation of virtual merchandise items at the checkout counter 1.

The checkout counter 1 is provided with the tray 41 on which the merchandise items that the user wants to purchase are to be placed. When the user places the real merchandise items 211 taken out from the exhibition shelf in the real merchandise sales area on the tray 41, cost calculation of the real merchandise items 211 is performed.

On the other hand, in a case where the user selects a virtual merchandise item 201 in the virtual merchandise sales area (see FIG. 3), the virtual merchandise item 201 selected by the user is displayed on the tray 41 of the checkout counter 1 by the MR glasses 2 of the user. Namely, the virtual merchandise item 201, which is a virtual 3D object of a merchandise item, is displayed in a superimposed manner on the tray 41 of the checkout counter 1 as the real space. Thereby, the real merchandise item(s) and the virtual merchandise item(s) that the user wants to purchase can be collectively seen on the tray 41 of the checkout counter 1.

Here, in the present embodiment, in accordance with the operation of selecting a virtual merchandise item 201 displayed by the MR glasses 2 in the virtual merchandise sales area (see FIG. 3), the selected virtual merchandise item is registered in the shopping list, and the virtual merchandise item 201 registered in the shopping list is displayed on the tray 41 of the checkout counter 1. At this time, in accordance with the selection operation by the user, the virtual merchandise sales area controller 6 registers the virtual merchandise item 201 in the shopping list, and the checkout counter 1 acquires the information of the shopping list from the virtual merchandise sales area controller 6 and controls the MR glasses 2 of the user so that the virtual merchandise item 201 registered in the shopping list is displayed on the tray 41 of the checkout counter 1.

Note that the virtual merchandise item does not have to be displayed in actual size. For example, in the case of a merchandise item with large dimensions, if the virtual merchandise item is displayed in actual size, the virtual merchandise item may protrude from the tray 41. Also, if the number of merchandise items increases, there may be a case where all the merchandise items to be purchased do not fit on the tray 41. In this case, by displaying the virtual merchandise items in reduced size, it is possible to make all the merchandise items to be purchased fit on the tray 41.

As described above, in the present embodiment, it is possible to purchase the virtual merchandise items exhibited in the virtual merchandise sales area together with the real merchandise items exhibited in the real merchandise sales area. For example, large or heavy merchandise items such as rice, shampoo, and detergents, namely, merchandise items difficult to take home may be exhibited in the virtual merchandise sales area as virtual merchandise items so that they will be delivered to the users' home. On the other hand, merchandise items that are consumed quickly, such as lunch boxes, side dishes, fresh foods (vegetables, fresh fish, etc.), and merchandise items for which the user wishes to evaluate actual items, such as fresh foods, may be exhibited in the real merchandise sales area as real merchandise items so that the user can take them home from there. Thereby, convenience for the user can be enhanced. Also, in the present embodiment, since the virtual merchandise items are displayed in the real store, unlike the virtual stores in EC shopping, the user can get the real feeling of shopping.

Figure 6:
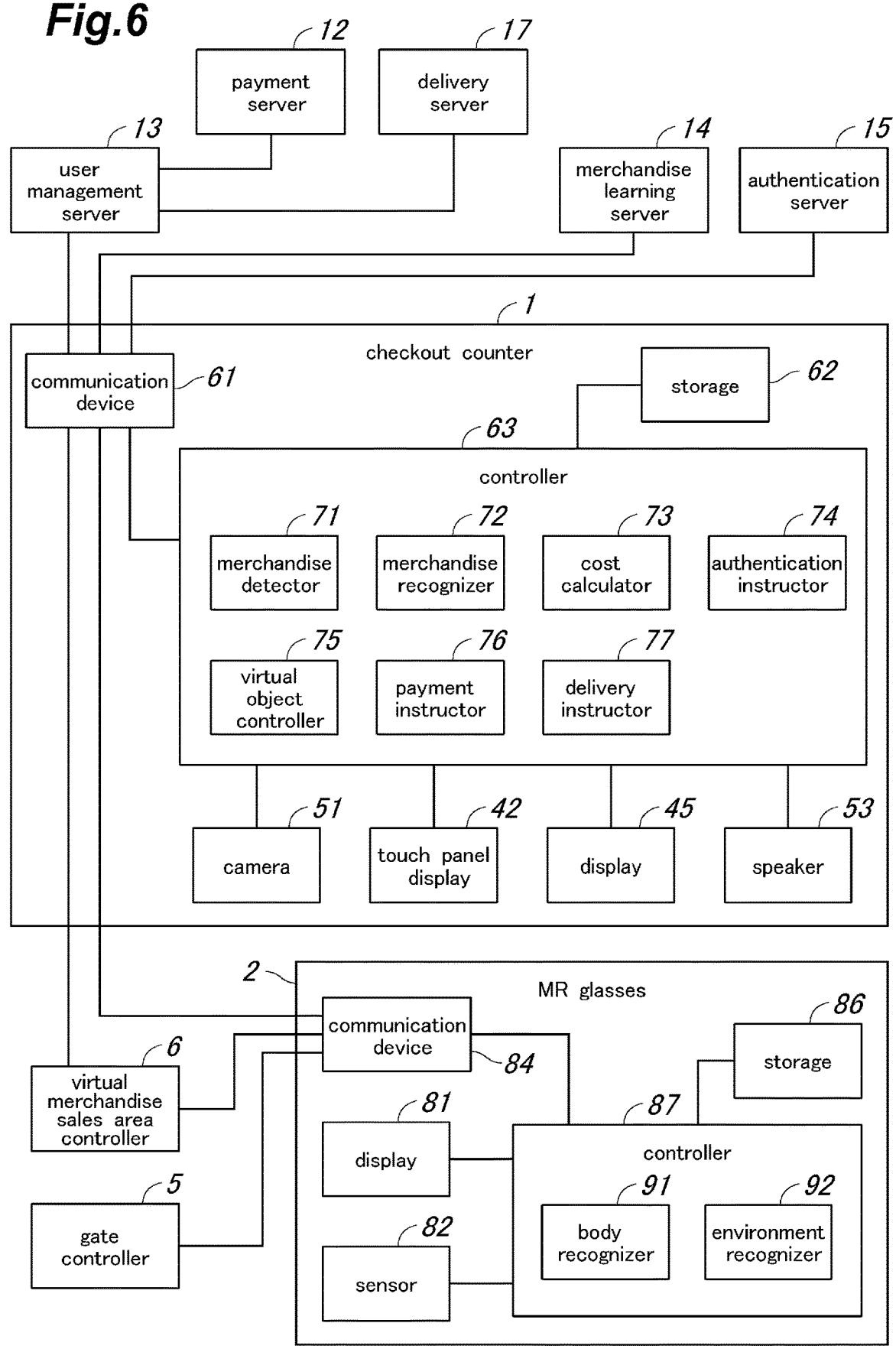
FIG. 6 is a block diagram showing a schematic configuration of the checkout counter 1 and MR glasses 2.

Next, a description will be made of a schematic configuration of the checkout counter 1 and the MR glasses 2. FIG. 6 is a block diagram showing a schematic configuration of the checkout counter 1 and the MR glasses 2.

The checkout counter 1 is provided with a communication device 61, a storage 62, and a controller 63 in addition to the cameras 51, the touch panel display 42, the display 45, and the speakers 53 (see FIG. 4). Note that the communication device 61, the storage 62, and the controller 63 constitute the controller 49 (see FIG. 4).

The communication device 61 communicates with the user management server 13, the merchandise learning server 14, the authentication server 15, the MR glasses 2, and the virtual merchandise sales area controller 6 via a network.

The storage 62 stores programs executed by the processor constituting the controller 63. Also, the storage 62 stores the merchandise master information. Specifically, the storage 62 stores identification information of the merchandise items (the merchandise name, merchandise code, etc.), information used in the cost calculation (namely, information related to the price of each merchandise item (unit price)), etc.

The controller 63 includes a merchandise detector 71, a merchandise recognizer 72, a cost calculator 73, an authentication instructor 74, a virtual object controller 75, a payment instructor 76, and a delivery instructor 77. This controller 63 is constituted of a processor and each functional unit of the controller 63 is realized by executing the programs stored in the storage 62 by the processor.

The merchandise detector 71 detects placement of merchandise items on the tray 41 based on the images captured by the cameras 51 arranged to capture images of the tray 41. Also, when merchandise items are placed on the tray 41, the merchandise detector 71 detects the positions of the merchandise items based on the images captured by the cameras 51.

The merchandise recognizer 72 recognizes the merchandise items placed on the tray 41 based on the images captured by the cameras 51. In the present embodiment, the merchandise recognizer 72 uses the object recognition engine constructed through machine learning such as deep learning to acquire the merchandise identification information (merchandise name, etc.) from the merchandise images cut out from the images captured by the cameras 51.

The cost calculator 73 calculates the cost of the merchandise items placed on the tray 41 based on the result of merchandise recognition by the merchandise recognizer 72. Namely, the cost calculator 73 acquires the price (unit price) of each merchandise item placed on the tray 41 and aggregates the prices of the merchandise items, thereby to calculate the total amount to be paid (aggregation). Also, in the present embodiment, when the user selects a virtual merchandise item in the virtual merchandise sales area, the information of the shopping list in which the selected virtual merchandise item(s) is/are registered is provided from the virtual merchandise sales area controller 6, and the cost calculator 73 calculates, based on the information of the shopping list, the cost of the virtual merchandise item(s) together with the real merchandise item(s) placed on the tray 41.

To identify the user at the time of payment, the authentication instructor 74 instructs the authentication server 15 to perform authentication or the user management server 13 to perform password authentication. Here, in the iris authentication, the authentication instructor 74 acquires the iris information of the user from the MR glasses 2 and transmits the iris information to the authentication server 15. Also, in the password authentication, the authentication instructor 74 transmits the user ID and the password entered by the user to the user management server 13. Note that for security enhancement, it is possible to adopt two-factor authentication consisting of the iris authentication (biometric authentication) and the password authentication so that the condition is satisfied when both the iris authentication and the password authentication are successful.

The virtual object controller 75 controls the MR glasses 2 of the user to display virtual merchandise items (virtual 3D objects of merchandise items) in a superimposed manner on the tray 41 of the checkout counter 1 as the real space. Note that when the checkout counter 1 performs the cost calculation of the merchandise items to be purchased, the checkout counter 1 acquires the information of the shopping list from the virtual merchandise sales area controller 6, and controls the MR glasses 2 of the user to display the virtual merchandise items registered in the shopping list on the tray 41 of the checkout counter 1.

Here, the virtual merchandise items are displayed alongside the real merchandise items placed on the tray 41, and at this time, to prevent the real merchandise items from being hidden from view of the user by the virtual merchandise items, the positions of the real merchandise items on the tray 41 are detected, and based on the position information, the positions where the virtual merchandise items are displayed are decided. Note that the detection of the positions of the real merchandise items on the tray 41 may be carried out based on the images captured by the cameras 51 provided on the checkout counter 1, or may be carried out based on the detection result by a sensor 82 of the MR glasses 2.

The payment instructor 76 instructs the payment server 12 to execute the payment process regarding the cost calculated by the cost calculation for the user (person to make payment) identified by the iris authentication and the password authentication.

The delivery instructor 77 instructs the delivery department (delivery center) to deliver the actual items of the virtual merchandise items to a location (delivery destination) specified by the user (delivery arrangement). Specifically, the delivery instructor 77 generate arrangement information for instructing delivery of the actual items of the virtual merchandise items, and transmits the arrangement information to the delivery server 17 via the user management server 13. The arrangement information includes the delivery destination information (name and address) of the user. Note that the delivery destination information of the user is preregistered based on input operation by the user.

Note that for real merchandise items, the payment of cost is necessarily performed at the checkout counter 1, but in the case of virtual merchandise items, similarly to the case of EC shopping, payment of the cost can be made outside the store as in cash on delivery service, in which the payment is made at the time of delivery of the merchandise items or transfer procedure using a convenience store or a financial institution, and thus, the payment at the checkout counter 1 may be omitted according to the user's request, etc.

The MR glasses 2 are provided with a display 81, a sensor 82, a communication device 84, a storage 86, and a controller 87. Note that the MR glasses 2 may be equipped with a speaker besides them.

The display 81 displays an MR screen for superimposing virtual objects in the real space.

The sensor 82 detects objects around the own device. In the present embodiment, as the sensor 82, an outward-facing camera for capturing an image of the hands of the person wearing the own device, an inward-facing camera for capturing an image of an eyeball of the user for iris authentication, etc. are provided.

The communication device 84 performs communication with the checkout counter 1, the gate controller 5, and the virtual merchandise sales area controller 6.

The storage 86 stores programs executed by a processor constituting the controller 87.

The controller 87 includes a body recognizer 91 and an environment recognizer 92. This controller 87 is constituted of a processor and each functional unit of the controller 87 is realized by executing the programs stored in the storage 86 by the processor.

The body recognizer 91 recognizes a hand gesture (motion of the hand) of the user wearing the own device based on the detection result by the sensor 82. The virtual merchandise sales area controller 6 detects an operation of the user, for example, an operation of selecting a virtual merchandise item, based on the hand gesture recognition result acquired by the body recognizer 91 (hand tracking). Also, the virtual merchandise sales area controller 6 controls the display of the virtual exhibition shelf by the MR glasses 2 based on the hand gesture recognition result.

Further, the body recognizer 91 acquires an eyeball image captured by a camera as the sensor 82, and extracts iris information (iris image or iris features) from the eyeball image. The authentication server 15 performs iris authentication based on the iris information of the user acquired by the body recognizer 91, thereby to identify the user.

The environment recognizer 92 recognizes the environment around the user wearing the own device; for example, the floor surface of the store on which the user is standing, the surface of the tray 41 of the checkout counter 1, etc.

Note that the virtual merchandise sales area controller 6 or the checkout counter 1 may have the functions of the body recognizer 91 and/or the environment recognizer 92.

Next, a description will be made of the screens displayed on the touch panel display 42 of the checkout counter 1. FIGS. 7 and 8 are explanatory diagrams showing the screens displayed on the touch panel display 42 of the checkout counter 1.

Figure 7A:
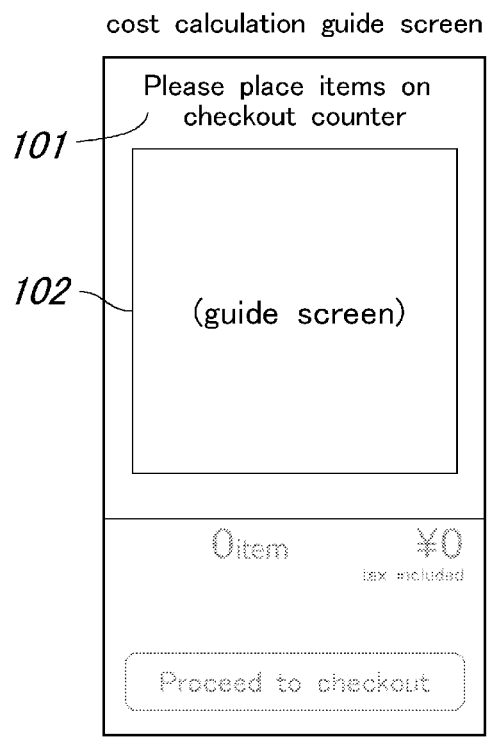
FIGS. 7(A)-7(C) are explanatory diagrams showing screens displayed on a touch panel display 42 of the checkout counter 1.

The touch panel display 42 of the checkout counter 1 first displays a cost calculation guide screen shown in FIG. 7(A). This cost calculation guide screen displays a guide message 101 prompting the user to place the merchandise items on the tray 41 of the checkout counter 1 and a guide image 102 (illustration or the like) for explaining how to place the merchandise items. Here, when the user places the merchandise items on the tray 41, processes of merchandise recognition and cost calculation are performed at the checkout counter 1, and the screen transitions to a purchase item verification screen (see FIG. 7(B)).

Figure 7B:
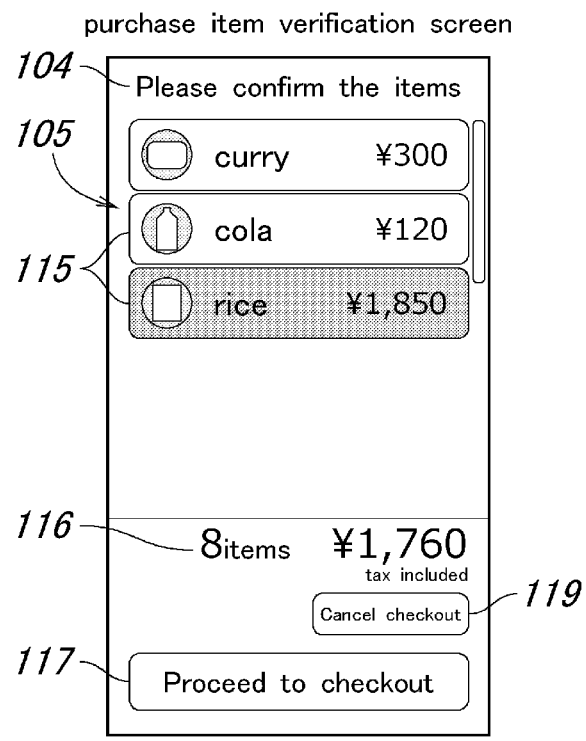

In the purchase item verification screen shown in FIG. 7(B), a guide message 104 for prompting the user to confirm the merchandise items to be purchased is displayed. Also, in this purchase item verification screen, a recognition result list display portion 105 is provided. In this recognition result list display portion 105, item boxes 115 (item display portions) indicating the name and price of the respective merchandise items are displayed side by side. The item boxes 115 relate both to the real merchandise items placed on the tray 41 by the user and to the virtual merchandise items selected by the user in the virtual merchandise sales area. Note that the display form (for example, color or the like) may be changed for the item boxes 115 related to real merchandise items and for the item boxes 115 related to virtual merchandise items.

Also, the purchase item verification screen is provided with a cost calculation result display portion 116. In this cost calculation result display portion 116, the cost calculation result, namely, the total number of the merchandise items placed on the tray 41 and the total amount of money thereof are displayed.

Further, the purchase item verification screen is provided with a "Proceed to checkout" button 117 and a "Cancel checkout" button 119. Here, when the user operates the "Proceed to checkout" button 117, the cost calculation result is fixed and the process transitions to the authentication process for payment, whereby iris authentication for identifying the user as the person to make payment is performed. On the other hand, when the user operates the "Cancel checkout" button 119, the screen transitions to a cancel screen (not shown in the drawings). When the user removes the merchandise items from the tray 41 also, the screen transitions to the cancel screen (not shown in the drawings).

Figure 7C:
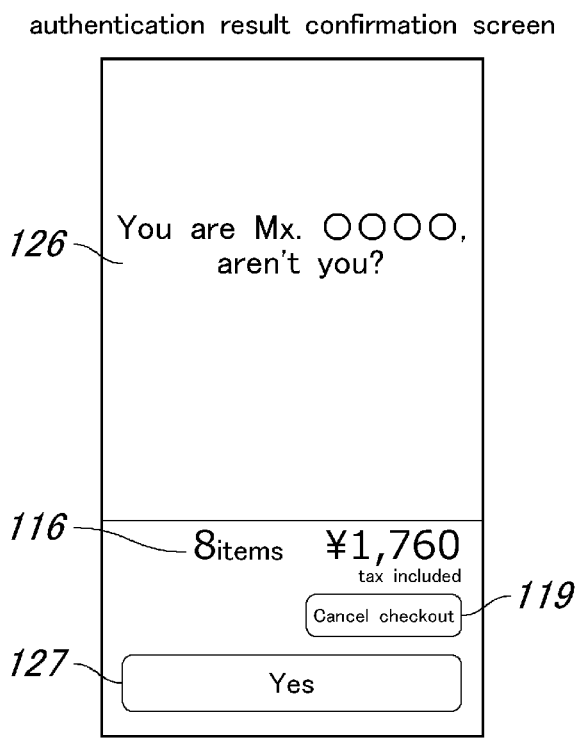

Here, when the iris authentication is successful, the screen transitions to an authentication result confirmation screen (see FIG. 7(C)). On the other hand, when the iris authentication fails, an error screen (not shown in the drawings) is displayed.

In the authentication result confirmation screen shown in FIG. 7(C), a message 126 inquiring whether the user's name is correct is displayed. Also, the authentication result confirmation screen is provided with a "Yes" button 127. Here, when the user operates the "Yes" button 127, the screen transitions to a password authentication screen (see FIG. 8(A)). Note that the cost calculation result display portion 116 and the "Cancel checkout" button 119 displayed in the screen of FIG. 7(C) are the same as in the purchase item verification screen (see FIG. 7(B)).

Figure 8A:
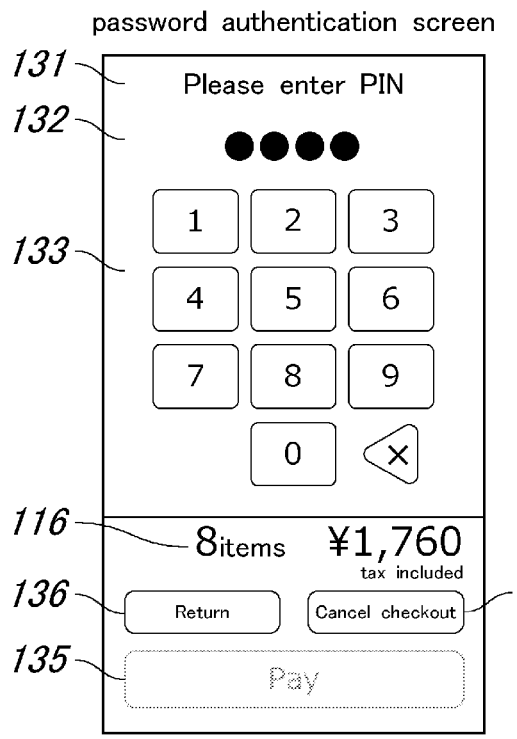
FIGS. 8(A)-8(C) are explanatory diagrams showing screens displayed on the touch panel display 42 of the checkout counter 1.

The password authentication screen shown in FIG. 8(A) includes a message 131 prompting the user to enter a personal identification number as the password, an image 132 representing an entry status of the personal identification number, and a numeric keypad 133. Here, when the entry of a personal identification number with a prescribed number of digits is finished, password authentication is executed, and if the password authentication is successful, the screen transitions to a payment verification screen (see FIG. 8(B)). On the other hand, when the password authentication fails, the user is prompted to enter the password again.

Also, the password authentication screen is provided with a "Pay" button 135 and a "Return" button 136. Here, when the user operates the "Return" button 136, the screen returns to a state in which the personal identification number has not been entered yet. The "Pay" button 135 is grayed out and not operable.

Figure 8B:
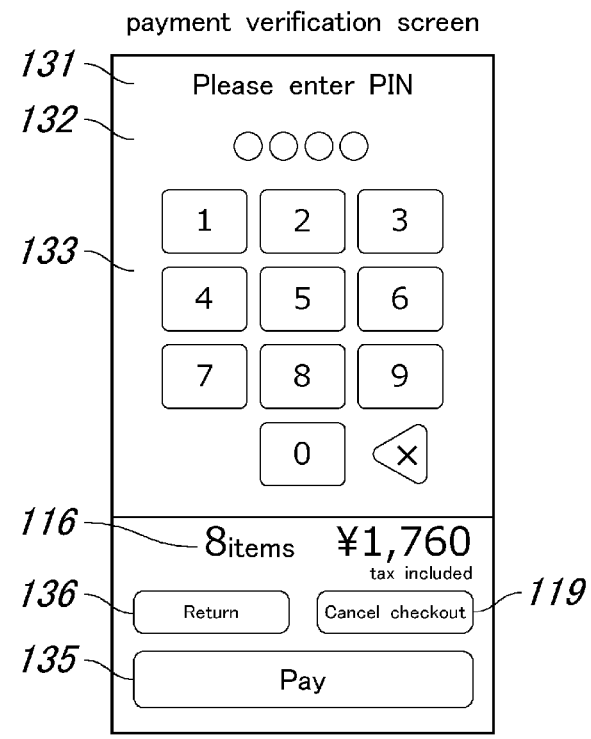
Figure 8C:
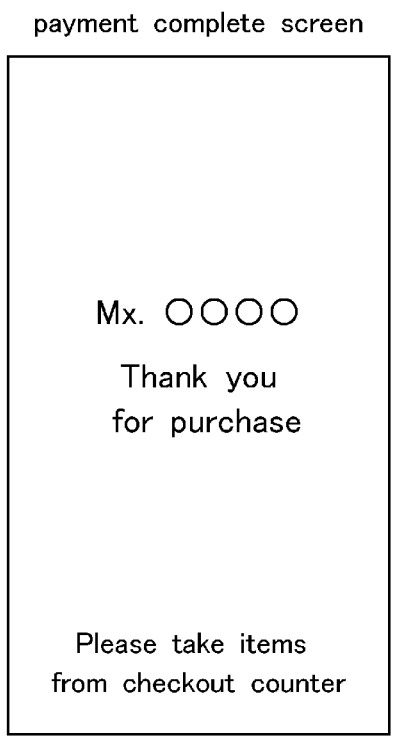

In the payment verification screen shown in FIG. 8(B), the "Pay" button 135 becomes operable, and if the user operates the "Pay" button 135, the screen transitions to a payment complete screen (see FIG. 8(C)). Note that the cost calculation result display portion 116 and the "Cancel checkout" button 119 displayed in FIGS. 8(A) and (B) are the same as in the purchase item verification screen (see FIG. 7(B)).

Next, a description will be made of an operating procedure of the user terminal 11 at the time of user registration. FIG. 9 is a flowchart showing an operating procedure of the user terminal 11 at the time of user registration.

When activated after installation of the application for the first time, the user terminal 11 first displays a personal information verification screen (ST101). In this personal information verification screen, a consent related to the handling of the personal information is displayed. When the user performs an operation to approve the consent in the personal information verification screen, an authentication information entry screen is displayed (ST102).

Subsequently, when the user performs an operation of entering the user ID and the password in the authentication information entry screen, the user ID and the password are transmitted to the user management server 13 (ST103).

Then, a personal information entry screen is displayed on the user terminal 11 (ST104). With this personal information entry screen, the user can enter the personal information. At this time, the user's name, attributes (such as sex and birth date), delivery destination information (the user's address, etc.), etc. are entered as the personal information. When the user performs an operation of entering the personal information in this personal information entry screen, the personal information including the birth date, etc. is transmitted to the user management server 13 (ST105).

Next, an eyeball image capturing screen for iris authentication is displayed on the user terminal 11 (ST104). When the user performs an operation to capture an image of the eyeball of her/his own in this eyeball image capturing screen, an eyeball image is extracted from the captured image, and the eyeball image is transmitted to the user management server 13 (ST107).

At this time, the user management server 13 performs a process of registering the user ID and the password acquired from the user terminal 11. Also, the user management server 13 transmits the eyeball image acquired from the user terminal 11 to the authentication server 15, and the authentication server 15 performs a process of registering the eyeball image.

Subsequently, the user terminal 11 displays a credit information entry screen (ST108). When the user performs an operation of entering the credit information in the credit information entry screen, the credit information is transmitted to the payment server 12 (ST109). The payment server 12 performs a process of registering the credit information acquired from the user terminal 11.

Then, upon receipt of a notification of completion of the credit information registration from the payment server 12, the user terminal 11 displays a registration complete screen (ST110).

Note that the user can perform the operation of user registration at the register 7 installed in the store also, and the procedure therefor is the same as in the case of the user terminal 11.

Figure 10:
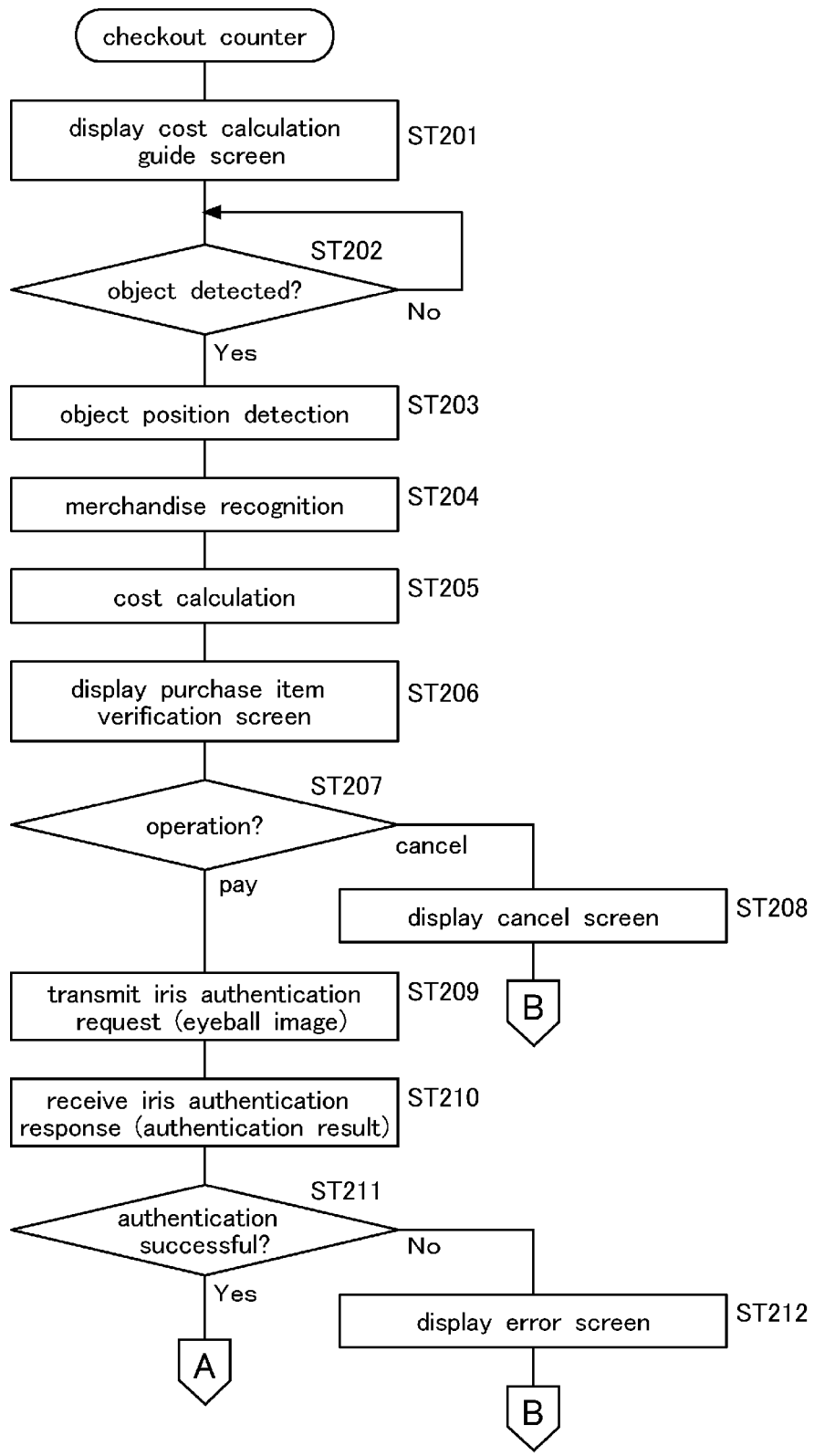
FIG. 10 is a flowchart showing an operating procedure of the checkout counter 1.
Figure 11:
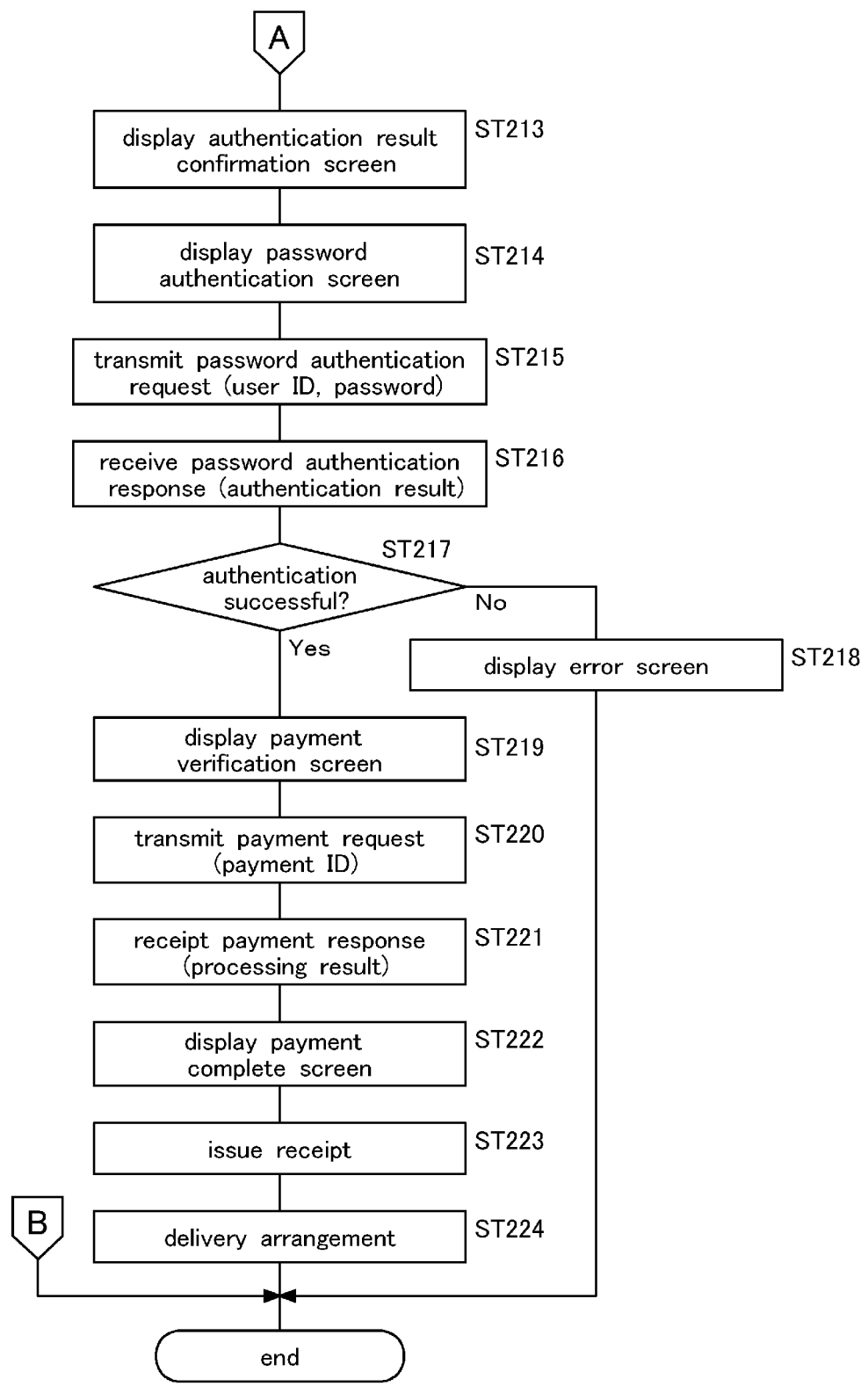
FIG. 11 is a flowchart showing the operating procedure of the checkout counter 1.

Next, a description will be made of an operating procedure of the checkout counter 1. FIGS. 10 and 11 are flowcharts showing an operating procedure of the checkout counter 1.

At the checkout counter 1, a cost calculation guide screen (see FIG. 7(A)) is first displayed (ST201). If placement of one or more objects on the tray 41 is detected based on the images captured by the cameras 51 (Yes in ST202), the positions of the objects placed on the tray 41 are detected (ST203). Subsequently, it is identified which merchandise item corresponds to each object placed on the tray 41 (ST204). Then, the cost of the merchandise items placed on the tray 41 is calculated (ST205). Thereafter, the purchase item verification screen (see FIG. 7(B)) is displayed (ST206).

Subsequently, when the user performs an operation of selecting cancel in the purchase item verification screen (see FIG. 7(B)), specifically, when the user operates the "Cancel checkout" button 119 ("cancel" in ST207), the screen transitions to the cancel screen (not shown in the drawings) (ST208). Note that here, in case there is an error in the cost calculation result due to failure of merchandise recognition or in case the user cancels purchase of some of the merchandise items, configuration may be made to allow an operation for correction of merchandise items (change, addition, and/or deletion of merchandise items).

On the other hand, when the user performs an operation of approving the purchase and instructing the payment, specifically, when the user operates the "Proceed to checkout" button 117 ("pay" in ST207), the cost calculation result is fixed and the process transitions to the authentication process for payment. Namely, the iris information is acquired from the MR glasses 2 and an identity authentication request including the iris information is transmitted to the authentication server 15 (ST209). At this time, in response to the iris authentication request, the authentication server 15 performs iris authentication based on the iris information acquired from the checkout counter 1 and transmits an iris authentication response including the authentication result to the checkout counter 1.

Then, the checkout counter 1 receives an iris authentication response from the authentication server 15 (ST210), and when the authentication result included in the iris authentication response is failure (No in ST211), displays an error screen (not shown in the drawings) (ST212). On the other hand, when the authentication result included in the iris authentication response is success (Yes in ST211), the authentication result confirmation screen (see FIG. 7(C)) is displayed (ST213).

When the user operates the "Yes" button 127 in this authentication result confirmation screen (see FIG. 7(C)), the process proceeds to the password authentication, and the password authentication screen (see FIG. 8(A)) is displayed (ST214).

Subsequently, when the user enters a password (personal identification number) in the password authentication screen (see FIG. 8(A)), the checkout counter 1 transmits a password authentication request to the user management server 13 (ST215). Upon receipt of the password authentication request, the user management server 13 performs password authentication based on the authentication information acquired from the checkout counter 1 and a transmits a password authentication response including the authentication result to the checkout counter 1.

Subsequently, the checkout counter 1 receives the password authentication response from the user management server 13 (ST216), and when the authentication result included in the password authentication response is failure (No in ST217), displays an error screen (not shown in the drawings) (ST208). On the other hand, when the authentication result included in the password authentication response is success (Yes in ST217), a payment verification screen (see FIG. 8(B)) is displayed (ST219).

When the user operates the "Pay" button 135 in this payment verification screen (see FIG. 8(B)), a payment request is transmitted to the payment server 12 via the user management server 13 (ST220). Upon receipt of the payment request, the payment server 12 executes the payment process and transmits a payment response to the checkout counter 1 via the user management server 13.

Then, upon receipt of the payment response from the payment server 12 (ST221), the checkout counter 1 displays the payment complete screen (see FIG. 8(C)) (ST222). Subsequently, the checkout counter 1 performs a receipt issuance process (ST223). At this time, the receipt information is transmitted to the user terminal 11 via the user management server 13, and the received receipt information is stored in the user terminal 11.

Also, at the checkout counter 1, arrangement information for instructing delivery of the actual items of the virtual merchandise items purchased by the user is generated, and the arrangement information is transmitted to the delivery server 17 via the user management server 13 (delivery arrangement) (ST224).

Note that in the present embodiment, two-factor authentication consisting of the iris authentication and the password authentication is adopted to enhance security in the payment of the purchase cost at the checkout counter 1, and the password authentication is performed even when the iris authentication is successful, but it is possible to omit the password authentication and to perform only the iris authentication. Also, when the iris authentication fails, payment may be made only with the password authentication. In this case, the screen may transition to the screen in which the user selects or enters the user ID of his/her own, and thereafter transitions to the password authentication screen (see FIG. 8(A)) in ST214.

Also, though the iris authentication was performed in the present embodiment, face authentication may be performed instead of the iris authentication. In this case, a camera for capturing an image of the user's face may be provided on the checkout counter 1 so that the face authentication is performed based on the face image extracted from the image captured by the camera. Further, authentication other than such biometric authentication (iris authentication, face authentication, and the like), for example, card authentication using an IC card or the like may be performed.

In the foregoing, embodiments have been described as examples of the technology disclosed in the present application. However, the technology of the present disclosure is not limited to this, and may be applied to embodiments in which change, replacement, addition, omission, etc. may be done. Also, structural elements described in the foregoing embodiments may be combined to form new embodiments.

INDUSTRIAL APPLICABILITY

The cost calculation and payment device, the cost calculation and payment system, and the cost calculation and payment method according to the present disclosure have effects that they can enhance convenience for the user by allowing the user to purchase merchandise items non-existent in the store in addition to merchandise items existent in the store and can allow the user to sufficiently check the merchandise items non-existent in the store as with the merchandise items existent in the store and to fully get the real feeling of having purchased merchandise items, and are useful as a cost calculation and payment device configured to recognize the merchandise items selected by the user in the sales area and to perform a process related to calculation and payment of the cost thereof as well as a cost calculation and payment system and a cost calculation and payment method using the cost calculation and payment device, or the like.

LIST OF REFERENCE NUMERALS 1 checkout counter (cost calculation and payment device)
2 MR glasses (virtual object display device)
3 entrance gate
4 exit gate
5 gate controller
6 virtual merchandise sales area controller (virtual object control device)
17 delivery server
31 main body
41 tray (placement portion)
42 touch panel display (display)
51 camera
63 controller
71 merchandise detector
72 merchandise recognizer
73 cost calculator
74 authentication instructor
75 virtual object controller
76 payment instructor
201 virtual merchandise item
202 virtual exhibition shelf
211 real merchandise item

The invention claimed is:

1. A cost calculation and payment device for performing a process related to cost calculation and payment for merchandise items selected by a user in a store, the device comprising:
a main body having a placement portion on which a real merchandise item selected by the user in a sales area is to be placed;
a camera configured to capture an image of the real merchandise item placed on the placement portion;
a controller configured to recognize a target merchandise item based on a merchandise image acquired by image capture performed by the camera and to perform a process related to cost calculation and payment; and
a display configured to display cost calculation result and payment result acquired by the controller,
wherein, in response to the user's operation of selecting a virtual merchandise item which is displayed as a virtual object in a superimposed manner in a predetermined area in the store as a real space, the controller further performs cost calculation of the virtual merchandise item selected by the user together with the recognized real merchandise item.

2. The cost calculation and payment device according to claim 1, wherein the controller controls a virtual object display device to display the virtual merchandise item as the virtual object in a superimposed manner on the placement portion as the real space such that the virtual merchandise item is positioned alongside the real merchandise item placed on the placement portion.

3. The cost calculation and payment device according to claim 1, wherein when the cost calculation or the payment related to purchase items including the virtual merchandise item is completed, the controller performs a process related to delivery of an actual item of the virtual merchandise item.

4. A cost calculation and payment system for performing a process related to cost calculation and payment for merchandise items selected by a user in a store, the system comprising:
a cost calculation and payment device having a placement portion on which a real merchandise item selected by the user in a sales area is to be placed, the cost calculation and payment device being configured to capture an image of the merchandise item placed on the placement portion, to recognize a target merchandise item based on a merchandise image acquired by the image capture, to perform a process related to cost calculation and payment, and to display results of the cost calculation and payment;
a virtual object display device configured to display a virtual object in a superimposed manner in a real space; and
a virtual object control device configured to control the virtual object display device to display a virtual merchandise item as the virtual object in a superimposed manner in a predetermined area in the store as the real space and to detect the user's operation of selecting the virtual merchandise item,
wherein, in response to the user's operation of selecting the virtual merchandise item, the cost calculation and payment device performs cost calculation of the virtual merchandise item selected by the user together with the recognized real merchandise item.

5. The cost calculation and payment system according to claim 4, wherein the cost calculation and payment device controls the virtual object display device to display the virtual merchandise item in a superimposed manner on the placement portion as the real space such that the virtual merchandise item is positioned alongside the real merchandise item placed on the placement portion.

6. The cost calculation and payment system according to claim 4, wherein the virtual object display device is a wearable device configured to be worn on a head of the user and to display the virtual object in a superimposed manner on a real field of vision of the user.

7. The cost calculation and payment system according to claim 4, wherein the virtual object display device is provided with a sensor configured to detect a motion of the user and recognizes a hand gesture of the user based on a detection result by the sensor, and
the virtual object control device detects the user's operation of selecting the virtual merchandise item based on a recognition result of the hand gesture.

8. A cost calculation and payment method for performing a process related to cost calculation and payment for merchandise items selected by a user in a store, wherein a virtual object control device controls a virtual object display device, which is configured to display a virtual object in a superimposed manner in a real space, to display a virtual merchandise item as the virtual object in a superimposed manner in a store as the real space, and detects the user's operation of selecting the virtual merchandise item, and a cost calculation and payment device captures an image of a real merchandise item selected by the user in a sales area and placed on a placement portion, recognizes a target merchandise item based on a merchandise image acquired by the image capture, and performs cost calculation of the virtual merchandise item selected by the user together with the recognized real merchandise item.

9. The cost calculation and payment method according to claim 8, wherein the cost calculation and payment device controls the virtual object display device to display the virtual merchandise item in a superimposed manner on the placement portion as the real space such that the virtual merchandise item is positioned alongside the real merchandise item placed on the placement portion.

\* \* \* \* \*